United States Patent
Batra et al.

(10) Patent No.: US 9,510,138 B2
(45) Date of Patent: Nov. 29, 2016

(54) PHY LAYER PARAMETER FOR BODY AREA NETWORK (BAN) DEVICES

(71) Applicant: Texas Instruments Incorporated, Dallas, TX (US)

(72) Inventors: Anuj Batra, Dallas, TX (US); Timothy M. Schmidl, Dallas, TX (US); Srinath Hosur, Plano, TX (US); June Chul Roh, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/709,549

(22) Filed: May 12, 2015

(65) Prior Publication Data

US 2015/0365782 A1    Dec. 17, 2015

Related U.S. Application Data

(63) Continuation of application No. 13/917,435, filed on Jun. 13, 2013, now Pat. No. 9,036,614, which is a continuation of application No. 12/760,516, filed on Apr. 14, 2010, now Pat. No. 8,488,655.

(Continued)

(51) Int. Cl.
| | |
|---|---|
| H04W 4/00 | (2009.01) |
| H04L 27/18 | (2006.01) |
| H04L 27/20 | (2006.01) |
| H04L 29/06 | (2006.01) |
| H04L 27/26 | (2006.01) |

(52) U.S. Cl.
CPC .............. *H04W 4/008* (2013.01); *H04L 27/18* (2013.01); *H04L 27/20* (2013.01); *H04L 27/2675* (2013.01); *H04L 69/22* (2013.01)

(58) Field of Classification Search
CPC .. H04W 4/008; H04L 27/2675; H04L 27/20; H04L 27/18; H04L 69/22
USPC .......... 370/338, 230, 339; 455/344, 73, 41.5
See application file for complete search history.

(56) References Cited

U.S. PATENT DOCUMENTS

| | | | |
|---|---|---|---|
| 6,424,820 B1 | 7/2002 | Burdick et al. | |
| 6,839,325 B2 | 1/2005 | Schmidl et al. | |
| 6,882,316 B2 | 4/2005 | McKinzie et al. | |
| 7,043,255 B1* | 5/2006 | Tiwari | H04W 8/18 455/456.1 |
| 7,304,977 B2 | 12/2007 | Chander et al. | |
| 7,889,753 B2 | 2/2011 | Ekbal et al. | |
| 8,274,885 B2* | 9/2012 | Wu | H04L 27/2626 370/210 |
| 8,923,773 B1* | 12/2014 | Gitlin | A61B 1/00016 455/575.6 |
| 2003/0060185 A1* | 3/2003 | Fisher | H04B 1/00 455/344 |
| 2006/0114928 A1* | 6/2006 | Utsunomiya | H04W 74/0808 370/448 |
| 2006/0159006 A1 | 7/2006 | Yeon et al. | |
| 2007/0183443 A1* | 8/2007 | Won | H04W 28/18 370/447 |

(Continued)

OTHER PUBLICATIONS

Agilent Technologies, CMMB Design Library, ADS 2009 Update 1, Oct. 2009 update 1, pp. 12-15.

*Primary Examiner* — Kwang B Yao
*Assistant Examiner* — Syed M Bokhari
(74) *Attorney, Agent, or Firm* — Tuenlap D. Chan; Frank D. Cimino

(57) ABSTRACT

In at least some embodiments, a communication device includes a transceiver with a physical (PHY) layer. The PHY layer is configured for body area network (BAN) operations in a limited multipath environment based on a constant symbol rate for BAN packet transmissions and based on M-ary PSK, differential M-ary PSK or rotated differential M-ary PSK modulation. The PHY layer is configured to transmit and receive data in a frequency band selected from the group consisting of: 402-405 MHz, 420-450 MHz, 863-870 MHz, 902-928 MHz, 950-956 MHz, 2360-2400 MHz, and 2400-2483.5 MHz.

35 Claims, 20 Drawing Sheets

Related U.S. Application Data

(60) Provisional application No. 61/319,063, filed on Mar. 30, 2010, provisional application No. 61/318,076, filed on Mar. 26, 2010, provisional application No. 61/313,440, filed on Mar. 12, 2010, provisional application No. 61/306,663, filed on Feb. 22, 2010, provisional application No. 61/300,312, filed on Feb. 1, 2010, provisional application No. 61/172,889, filed on Apr. 27, 2009, provisional application No. 61/172,559, filed on Apr. 24, 2009, provisional application No. 61/170,764, filed on Apr. 20, 2009, provisional application No. 61/169,048, filed on Apr. 14, 2009, provisional application No. 61/169,054, filed on Apr. 14, 2009.

(56) References Cited

U.S. PATENT DOCUMENTS

| | | |
|---|---|---|
| 2007/0255318 A1 | 11/2007 | Dudding et al. |
| 2008/0045161 A1* | 2/2008 | Lee ............... H03F 3/217 455/73 |
| 2008/0117939 A1 | 5/2008 | Ekbal et al. |
| 2010/0091789 A1* | 4/2010 | Choi ............... H04L 12/413 370/445 |
| 2010/0255780 A1* | 10/2010 | Rajagopal ......... H04W 52/287 455/41.2 |
| 2010/0260236 A1 | 10/2010 | Batra et al. |
| 2010/0261429 A1 | 10/2010 | Batra et al. |
| 2011/0069707 A1 | 3/2011 | Roh et al. |

\* cited by examiner

| PACKET COMPONENT | MODULATION | SYMBOL RATE (ksps) | CODE RATE (k/n) | SPREADING FACTOR (S) | PULSE SHAPE | INFORMATION DATA RATE (kbps) | SUPPORT |
|---|---|---|---|---|---|---|---|
| PLCP HEADER | π/2-DBPSK | 187.5 | 19/31* | 2 | SRRC | 57.5 | MANDATORY |
| PSDU | π/2-DBPSK | 187.5 | 51/63 | 2 | SRRC | 75.9 | MANDATORY |
| PSDU | π/2-DBPSK | 187.5 | 51/63 | 1 | SRRC | 151.8 | MANDATORY |
| PSDU | π/4-DQPSK | 187.5 | 51/63 | 1 | SRRC | 303.6 | MANDATORY |
| PSDU | π/8-D8PSK | 187.5 | 51/63 | 1 | SRRC | 455.4 | OPTIONAL |
| * BCH (31, 19) CODE IS A SHORTENED CODE DERIVED FROM A BCH (63, 51) CODE | | | | | | | |

200    FIG. 2A

| PACKET COMPONENT | MODULATION | SYMBOL RATE (ksps) | CODE RATE (k/n) | SPREADING FACTOR (S) | BT | INFORMATION DATA RATE (kbps) | SUPPORT |
|---|---|---|---|---|---|---|---|
| PLCP HEADER | GMSK | 187.5 | 19/31* | 2 | 0.5 | 57.5 | MANDATORY |
| PSDU | GMSK | 187.5 | 51/63 | 2 | 0.5 | 75.9 | MANDATORY |
| PSDU | GMSK | 187.5 | 51/63 | 1 | 0.5 | 151.8 | MANDATORY |
| PSDU | GMSK | 187.5 | 1/1 | 1 | 0.5 | 187.5 | OPTIONAL |
| * BCH (31, 19) CODE IS A SHORTENED CODE DERIVED FROM A BCH (63, 51) CODE | | | | | | | |

210    FIG. 2B

| PACKET COMPONENT | MODULATION | SYMBOL RATE (ksps) | CODE RATE (k/n) | SPREADING FACTOR (S) | PULSE SHAPE | INFORMATION DATA RATE (kbps) | SUPPORT |
|---|---|---|---|---|---|---|---|
| PLCP HEADER | π/2-DBPSK | 250 | 19/31* | 2 | SRRC | 76.6 | MANDATORY |
| PSDU | π/2-DBPSK | 250 | 51/63 | 2 | SRRC | 101.2 | MANDATORY |
| PSDU | π/2-DBPSK | 250 | 51/63 | 1 | SRRC | 202.4 | MANDATORY |
| PSDU | π/4-DQPSK | 250 | 51/63 | 1 | SRRC | 404.8 | MANDATORY |
| PSDU | π/8-D8PSK | 250 | 51/63 | 1 | SRRC | 607.1 | OPTIONAL |
| * BCH (31, 19) CODE IS A SHORTENED CODE DERIVED FROM A BCH (63, 51) CODE | | | | | | | |

| PACKET COMPONENT | MODULATION | SYMBOL RATE (ksps) | CODE RATE (k/n) | SPREADING FACTOR (S) | PULSE SHAPE | INFORMATION DATA RATE (kbps) | SUPPORT |
|---|---|---|---|---|---|---|---|
| PLCP HEADER | π/2-DBPSK | 300 | 19/31* | 2 | SRRC | 91.9 | MANDATORY |
| PSDU | π/2-DBPSK | 300 | 51/63 | 2 | SRRC | 121.4 | MANDATORY |
| PSDU | π/2-DBPSK | 300 | 51/63 | 1 | SRRC | 242.9 | MANDATORY |
| PSDU | π/4-DQPSK | 300 | 51/63 | 1 | SRRC | 485.7 | MANDATORY |
| PSDU | π/8-D8PSK | 300 | 51/63 | 1 | SRRC | 728.6 | OPTIONAL |
| * BCH (31, 19) CODE IS A SHORTENED CODE DERIVED FROM A BCH (63, 51) CODE | | | | | | | |

| PACKET COMPONENT | MODULATION | SYMBOL RATE (ksps) | CODE RATE (k/n) | SPREADING FACTOR (S) | PULSE SHAPE | INFORMATION DATA RATE (kbps) | SUPPORT |
|---|---|---|---|---|---|---|---|
| PLCP HEADER | π/2-DBPSK | 250 | 19/31* | 2 | SRRC | 76.6 | MANDATORY |
| PSDU | π/2-DBPSK | 250 | 51/63 | 2 | SRRC | 101.2 | MANDATORY |
| PSDU | π/2-DBPSK | 250 | 51/63 | 1 | SRRC | 202.4 | MANDATORY |
| PSDU | π/4-DQPSK | 250 | 51/63 | 1 | SRRC | 404.8 | MANDATORY |
| PSDU | π/8-D8PSK | 250 | 51/63 | 1 | SRRC | 607.1 | OPTIONAL |
| * BCH (31, 19) CODE IS A SHORTENED CODE DERIVED FROM A BCH (63, 51) CODE | | | | | | | |

| PACKET COMPONENT | MODULATION | SYMBOL RATE (ksps) | CODE RATE (k/n) | SPREADING FACTOR (S) | PULSE SHAPE | INFORMATION DATA RATE (kbps) | SUPPORT |
|---|---|---|---|---|---|---|---|
| PLCP HEADER | π/2-DBPSK | 600 | 19/31* | 4 | SRRC | 91.9 | MANDATORY |
| PSDU | π/2-DBPSK | 600 | 51/63 | 4 | SRRC | 121.4 | MANDATORY |
| PSDU | π/2-DBPSK | 600 | 51/63 | 2 | SRRC | 242.9 | MANDATORY |
| PSDU | π/2-DBPSK | 600 | 51/63 | 1 | SRRC | 485.7 | MANDATORY |
| PSDU | π/4-DQPSK | 600 | 51/63 | 1 | SRRC | 971.4 | MANDATORY |
| * BCH (31, 19) CODE IS A SHORTENED CODE DERIVED FROM A BCH (63, 51) CODE | | | | | | | |

| PACKET COMPONENT | MODULATION | SYMBOL RATE (ksps) | CODE RATE (k/n) | SPREADING FACTOR (S) | PULSE SHAPE | INFORMATION DATA RATE (kbps) | SUPPORT |
|---|---|---|---|---|---|---|---|
| PLCP HEADER | π/2-DBPSK | 600 | 19/31* | 4 | SRRC | 91.9 | MANDATORY |
| PSDU | π/2-DBPSK | 600 | 51/63 | 4 | SRRC | 121.4 | MANDATORY |
| PSDU | π/2-DBPSK | 600 | 51/63 | 2 | SRRC | 242.9 | MANDATORY |
| PSDU | π/2-DBPSK | 600 | 51/63 | 1 | SRRC | 485.7 | MANDATORY |
| PSDU | π/4-DQPSK | 600 | 51/63 | 1 | SRRC | 971.4 | MANDATORY |
| * BCH (31, 19) CODE IS A SHORTENED CODE DERIVED FROM A BCH (63, 51) CODE | | | | | | | |

| BIT | BIT VALUE | BIT | BIT VALUE | BIT | BIT VALUE | BIT | BIT VALUE |
|---|---|---|---|---|---|---|---|
| $b_0$ | 0 | $b_{23}$ | 0 | $b_{46}$ | 1 | $b_{69}$ | 0 |
| $b_1$ | 1 | $b_{24}$ | 0 | $b_{47}$ | 0 | $b_{70}$ | 1 |
| $b_2$ | 0 | $b_{25}$ | 1 | $b_{48}$ | 0 | $b_{71}$ | 0 |
| $b_3$ | 1 | $b_{26}$ | 1 | $b_{49}$ | 0 | $b_{72}$ | 1 |
| $b_4$ | 0 | $b_{27}$ | 1 | $b_{50}$ | 0 | $b_{73}$ | 0 |
| $b_5$ | 1 | $b_{28}$ | 0 | $b_{51}$ | 1 | $b_{74}$ | 1 |
| $b_6$ | 1 | $b_{29}$ | 0 | $b_{52}$ | 0 | $b_{75}$ | 1 |
| $b_7$ | 0 | $b_{30}$ | 0 | $b_{53}$ | 0 | $b_{76}$ | 0 |
| $b_8$ | 0 | $b_{31}$ | 1 | $b_{54}$ | 0 | $b_{77}$ | 1 |
| $b_9$ | 1 | $b_{32}$ | 0 | $b_{55}$ | 0 | $b_{78}$ | 1 |
| $b_{10}$ | 1 | $b_{33}$ | 1 | $b_{56}$ | 0 | $b_{79}$ | 0 |
| $b_{11}$ | 0 | $b_{34}$ | 1 | $b_{57}$ | 1 | $b_{80}$ | 1 |
| $b_{12}$ | 1 | $b_{35}$ | 1 | $b_{58}$ | 1 | $b_{81}$ | 1 |
| $b_{13}$ | 1 | $b_{36}$ | 1 | $b_{59}$ | 1 | $b_{82}$ | 0 |
| $b_{14}$ | 1 | $b_{37}$ | 0 | $b_{60}$ | 1 | $b_{83}$ | 1 |
| $b_{15}$ | 0 | $b_{38}$ | 0 | $b_{61}$ | 1 | $b_{84}$ | 1 |
| $b_{16}$ | 1 | $b_{39}$ | 1 | $b_{62}$ | 1 | $b_{85}$ | 0 |
| $b_{17}$ | 1 | $b_{40}$ | 0 | $b_{63}$ | 0 | $b_{86}$ | 1 |
| $b_{18}$ | 0 | $b_{41}$ | 1 | $b_{64}$ | 1 | $b_{87}$ | 1 |
| $b_{19}$ | 1 | $b_{42}$ | 0 | $b_{65}$ | 0 | $b_{88}$ | 0 |
| $b_{20}$ | 0 | $b_{43}$ | 0 | $b_{66}$ | 1 | $b_{89}$ | 1 |
| $b_{21}$ | 0 | $b_{44}$ | 0 | $b_{67}$ | 0 | | |
| $b_{22}$ | 1 | $b_{45}$ | 1 | $b_{68}$ | 1 | | |

| BIT | BIT VALUE | BIT | BIT VALUE | BIT | BIT VALUE | BIT | BIT VALUE |
|---|---|---|---|---|---|---|---|
| $b_0$ | 0 | $b_{23}$ | 1 | $b_{46}$ | 1 | $b_{69}$ | 0 |
| $b_1$ | 1 | $b_{24}$ | 0 | $b_{47}$ | 1 | $b_{70}$ | 1 |
| $b_2$ | 1 | $b_{25}$ | 0 | $b_{48}$ | 0 | $b_{71}$ | 0 |
| $b_3$ | 0 | $b_{26}$ | 1 | $b_{49}$ | 0 | $b_{72}$ | 1 |
| $b_4$ | 1 | $b_{27}$ | 0 | $b_{50}$ | 0 | $b_{73}$ | 0 |
| $b_5$ | 0 | $b_{28}$ | 0 | $b_{51}$ | 1 | $b_{74}$ | 1 |
| $b_6$ | 0 | $b_{29}$ | 1 | $b_{52}$ | 1 | $b_{75}$ | 1 |
| $b_7$ | 0 | $b_{30}$ | 1 | $b_{53}$ | 1 | $b_{76}$ | 0 |
| $b_8$ | 1 | $b_{31}$ | 1 | $b_{54}$ | 0 | $b_{77}$ | 1 |
| $b_9$ | 0 | $b_{32}$ | 1 | $b_{55}$ | 1 | $b_{78}$ | 1 |
| $b_{10}$ | 0 | $b_{33}$ | 0 | $b_{56}$ | 0 | $b_{79}$ | 0 |
| $b_{11}$ | 0 | $b_{34}$ | 0 | $b_{57}$ | 1 | $b_{80}$ | 1 |
| $b_{12}$ | 0 | $b_{35}$ | 0 | $b_{58}$ | 1 | $b_{81}$ | 1 |
| $b_{13}$ | 1 | $b_{36}$ | 0 | $b_{59}$ | 1 | $b_{82}$ | 0 |
| $b_{14}$ | 0 | $b_{37}$ | 0 | $b_{60}$ | 1 | $b_{83}$ | 1 |
| $b_{15}$ | 1 | $b_{38}$ | 1 | $b_{61}$ | 1 | $b_{84}$ | 1 |
| $b_{16}$ | 1 | $b_{39}$ | 1 | $b_{62}$ | 1 | $b_{85}$ | 0 |
| $b_{17}$ | 0 | $b_{40}$ | 0 | $b_{63}$ | 0 | $b_{86}$ | 1 |
| $b_{18}$ | 0 | $b_{41}$ | 1 | $b_{64}$ | 1 | $b_{87}$ | 1 |
| $b_{19}$ | 1 | $b_{42}$ | 1 | $b_{65}$ | 0 | $b_{88}$ | 0 |
| $b_{20}$ | 0 | $b_{43}$ | 1 | $b_{66}$ | 1 | $b_{89}$ | 1 |
| $b_{21}$ | 1 | $b_{44}$ | 0 | $b_{67}$ | 0 | | |
| $b_{22}$ | 0 | $b_{45}$ | 0 | $b_{68}$ | 1 | | |

FIG. 3B

| R0-R2 | 402-405 MHz DATE RATE (kbps) | 420-450 MHz DATE RATE (kbps) | 863-870 MHz, 950-956 MHz DATE RATE (kbps) | 902-928 MHz DATE RATE (kbps) | 2360-2400 MHz, 2400-2483.5 MHz DATE RATE (kbps) |
|---|---|---|---|---|---|
| 000 | 75.9 | 75.9 | 101.2 | 121.4 | 121.4 |
| 100 | 151.8 | 151.8 | 202.4 | 242.9 | 242.9 |
| 010 | 303.6 | 187.5 | 404.8 | 485.7 | 485.7 |
| 110 | 455.4 | RESERVED | 607.1 | 728.6 | 971.4 |
| 001 | RESERVED | RESERVED | RESERVED | RESERVED | RESERVED |
| 101 | RESERVED | RESERVED | RESERVED | RESERVED | RESERVED |
| 011 | RESERVED | RESERVED | RESERVED | RESERVED | RESERVED |
| 111 | RESERVED | RESERVED | RESERVED | RESERVED | RESERVED |

FIG. 20 — Table 2000

| b(n) | FREQUENCY DEVIATION |
|---|---|
| 0 | $-\Delta f$ |
| 1 | $+\Delta f$ |

FIG. 21 — Table 2100

| b(n) | $\varphi_k$ |
|---|---|
| 0 | $\pi/2$ |
| 1 | $3\pi/2$ |

FIG. 22 — Table 2200

| b(2n) | b(2n+1) | $\varphi_k$ |
|---|---|---|
| 0 | 0 | $\pi/4$ |
| 0 | 1 | $3\pi/4$ |
| 1 | 0 | $7\pi/4$ |
| 1 | 1 | $5\pi/4$ |

FIG. 23 — Table 2300

| b(3n) | b(3n+1) | b(3n+2) | $\varphi_k$ |
|---|---|---|---|
| 0 | 0 | 0 | $\pi/8$ |
| 0 | 0 | 1 | $3\pi/8$ |
| 0 | 1 | 0 | $7\pi/8$ |
| 0 | 1 | 1 | $5\pi/8$ |
| 1 | 0 | 0 | $15\pi/8$ |
| 1 | 0 | 1 | $13\pi/8$ |
| 1 | 1 | 0 | $9\pi/8$ |
| 1 | 1 | 1 | $11\pi/8$ |

2400

| FREQUENCY BAND (MHz) | RELATIONSHIP BETWEEN $f_c$ AND $n_c$ |
|---|---|
| 402-405 | $f_c = 402.15 + 0.30 \times n_c$ (MHz), $n_c = 0, ..., 9$ |
| 420-450 | $f_c = 420.30 + 0.50 \times g_1(n_c)$ (MHz), $n_c = 0, ..., 13$ |
| 863-870 | $f_c = 863.20 + 0.40 \times g_2(n_c)$ (MHz), $n_c = 0, ..., 11$ |
| 902-928 | $f_c = 903.50 + 0.50 \times n_c$ (MHz), $n_c = 0, ..., 47$ |
| 950-956 | $f_c = 951.10 + 0.40 \times n_c$ (MHz), $n_c = 0, ..., 11$ |
| 2360-2400 | $f_c = 2362.00 + 1.00 \times n_c$ (MHz), $n_c = 0, ..., 37$ |
| 2400-2483.5 | $f_c = 2402.00 + 1.00 \times n_c$ (MHz), $n_c = 0, ..., 78$ or $f_c = 2402.50 + 1.00 \times n_c$ (MHz), $n_c = 0, ..., 78$ |

| PREAMBLE SEQUENCE | RELATIONSHIP BETWEEN PREAMBLE SEQUENCE AND $n_c$ |
|---|---|
| 1 | $rem(n_c, 2) = 0$ |
| 2 | $rem(n_c, 2) = 1$ |

| PHY PARAMETER | VALUE |
|---|---|
| pSIFS | 50 μs |
| pMIFS | 20 μs |
| pEDTime | 8 PREAMBLE SYMBOLS |
| pCCATime | 63 PREAMBLE SYMBOLS |
| pChannelSwitchTime | 100 μs |

| MAC PARAMETER | VALUE |
|---|---|
| SIFS | pSIFS |
| MIFS | pMIFS |

| FREQUENCY (MHz) | -X dBr | $f_{BW}$ |
|---|---|---|
| 402-405 | -20 | 300 kHz |
| 420-450 | -40 | 320 kHz |
| 863-870 | -20 | 400 kHz |
| 902-928 | -20 | 500 kHz |
| 950-956 | -20 | 400 kHz |
| 2360-2400 | -20 | 1 MHz |
| 2400-2483.5 | -20 | 1 MHz |

| CONSTELLATION | EVM ERROR |
|---|---|
| π/2-DBPSK | 20.0% |
| π/4-DQPSK | 12.5% |
| π/8-D8PSK | 7.0% |

| FREQUENCY BAND (MHz) | INFORMATION DATA RATE (kbps) | MINIMUM SENSITIVITY (dBm) |
|---|---|---|
| 402-405 | 75.9 | -98 |
| | 151.8 | -95 |
| | 303.6 | -92 |
| | 455.4 | -86 |
| 420-450 | 75.9 | -93 |
| | 151.8 | -90 |
| | 187.5 | -87 |
| 863-870 950-956 | 101.2 | -97 |
| | 202.4 | -94 |
| | 404.8 | -90 |
| | 607.1 | -85 |
| 902-928 | 121.4 | -96 |
| | 242.9 | -93 |
| | 485.7 | -89 |
| | 728.6 | -84 |
| 2360-2400 2400-2483.5 | 121.4 | -95 |
| | 242.9 | -93 |
| | 485.7 | -90 |
| | 971.4 | -86 |

FIG. 32

PHY LAYER PARAMETER FOR BODY AREA NETWORK (BAN) DEVICES

CROSS-REFERENCE TO RELATED APPLICATION

The present application claims priority to: U.S. Provisional Patent Application No. 61/169,048, filed on Apr. 14, 2009; U.S. Provisional Patent Application No. 61/169,054, filed on Apr. 14, 2009; U.S. Provisional Patent Application No. 61/170,764, filed on Apr. 20, 2009; U.S. Provisional Patent Application No. 61/172,559, filed on Apr. 24, 2009; U.S. Provisional Patent Application No. 61/172,889, filed on Apr. 27, 2009; U.S. Provisional Patent Application No. 61/300,312, filed on Feb. 1, 2010; U.S. Provisional Patent Application No. 61/306,663, filed on Feb. 22, 2010; U.S. Provisional Patent Application No. 61/313,440, filed on Mar. 12, 2010; U.S. Provisional Patent Application No. 61/318,076, filed on Mar. 26, 2010; and U.S. Provisional Patent Application No. 61/319,063, filed on Mar. 30, 2010; all of which are hereby incorporated herein by reference.

This application also may contain subject matter that relates to the following commonly assigned applications incorporated herein by reference: "PHY Layer Options For Body Area Network (BAN) Devices," U.S. Ser. No. 12/760,510, filed Apr. 14, 2010 (now U.S. Pat. No. 8,275,342); and "PHY Layer PPDU Construction For Body Area Network (BAN) Devices," U.S. Ser. No. 12/760,513, filed Apr. 14, 2010 (now U.S. Pat. No. 8,391,228).

BACKGROUND

A medical body area network (BAN) refers to a low rate (e.g., less than 1 Mbps), very low-power (e.g., less than 3 mA), very short-range (e.g., less than 3 meters) wireless technology that is specifically designed to be used in medical applications, such as digital band-aids and pacemakers. As an example, BAN technology could be implemented with digital band-aids to measure vital statistics and wirelessly transfer the information to a larger network for further processing. Further, BAN technology could be implemented with pacemakers to enable doctors to fine tune the device after implantation and to extract information associated with cardiac events. The implementation of a new wireless technology, such as BAN, is not trivial.

SUMMARY

In at least some embodiments, a communication device includes a transceiver with a physical (PHY) layer. The PHY layer is configured for body area network (BAN) operations in a limited multipath environment based on a constant symbol rate for BAN packet transmissions and based on M-ary PSK, differential M-ary PSK or rotated differential M-ary PSK modulation. The PHY layer is configured to transmit and receive data in a frequency band selected from the group consisting of: 402-405 MHz, 420-450 MHz, 863-870 MHz, 902-928 MHz, 950-956 MHz, 2360-2400 MHz, and 2400-2483.5 MHz.

BRIEF DESCRIPTION OF THE DRAWINGS

For a detailed description of exemplary embodiments of the invention, reference will now be made to the accompanying drawings in which:

FIGS. 2A-2G show tables of data-rate dependent parameter information for a Physical Layer Convergence Protocol (PLCP) header and Physical Layer Data Unit (PSDU) in accordance with embodiments of the disclosure;

FIG. 3A-3B show tables of preamble sequence values in accordance with embodiments of the disclosure;

FIG. 20 shows a table with GMSK symbol mapping information in accordance with embodiments of the disclosure;

FIG. 21 shows a table with $\pi/2$-DBPSK mapping information in accordance with embodiments of the disclosure;

FIG. 22 shows a table with $\pi/4$-DBPSK mapping information in accordance with embodiments of the disclosure;

FIG. 23 shows a table with $\pi/8$-DBPSK mapping information in accordance with embodiments of the disclosure;

FIG. 24 shows a table with center frequency and channel number relationship information in accordance with embodiments of the disclosure;

FIG. 25 shows a table with channel number and preamble relationship information in accordance with embodiments of the disclosure;

FIG. 26 shows a table with PHY layer timing parameter information in accordance with embodiments of the disclosure;

FIG. 27 shows a table with inter-frame spacing parameter information in accordance with embodiments of the disclosure;

FIG. 28 shows a table of channel bandwidth information as function of frequency band of operation in accordance with embodiments of the disclosure;

FIG. 31 shows a table of permissible EVM information as a function of constellation size in accordance with embodiments of the disclosure;

FIG. 32 shows a table of receiver sensitivity information in accordance with embodiments of the disclosure.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Disclosed herein are options for a narrowband Physical (PHY) layer to support medical body area network (BAN) communications. The disclosed PHY layer options may be implemented by medical devices as well as devices in communication with medical devices. At least some of the disclosed PHY layer options may be adopted for the IEEE 802.15.6 specification. Although designed for use with medical devices (e.g., digital band-aids and pacemakers), it should be understood that the disclosed PHY layer options are not limited to medical device embodiments. Rather, the disclosed PHY layer options enable a low rate (e.g., less than 1 Mbps), very low-power (e.g., less than 3 mA), very short-range (e.g., less than 3 meters) wireless technology that operates in a limited multipath environment for use in any application.

Figure 1:
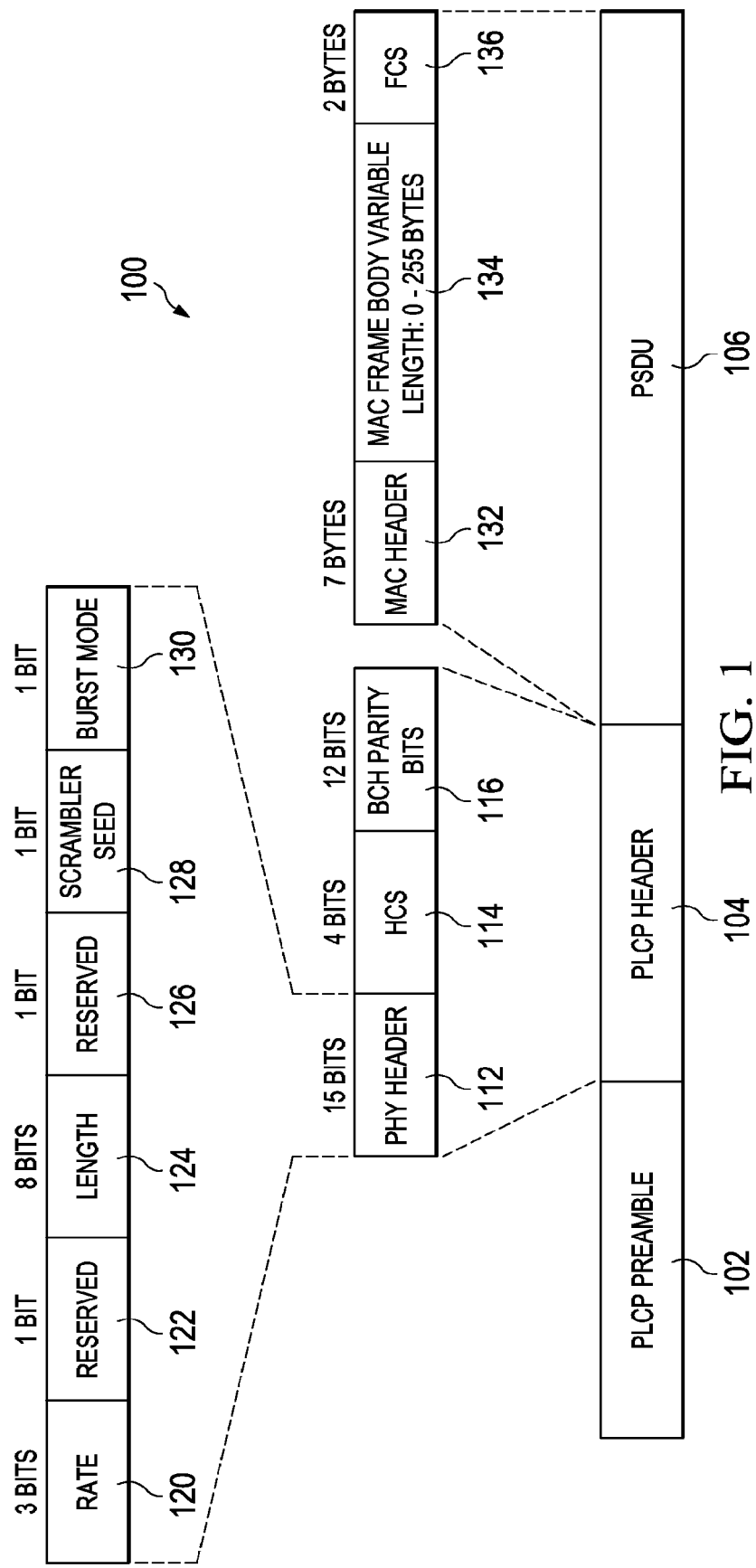
FIG. 1 shows a Physical-Layer Protocol Data Unit (PPDU) in accordance with embodiments of the disclosure.

In accordance with embodiments of the disclosure, the PHY is responsible for the following tasks: 1) activation and deactivation of the radio transceiver; 2) clear channel assessment (CCA) and listen before talk (LBT) within the current channel; and 3) data transmission and reception. FIG. 1 shows a Physical-Layer Protocol Data Unit (PPDU) 100 in accordance with embodiments of the disclosure. As shown, the PPDU 100 comprises a Physical Layer Convergence Protocol (PLCP) preamble 102, a PLCP header 104, and a physical-layer service data unit (PSDU) 106. Disclosed herein are options for transforming the PSDU 106 into the PPDU 100. Generally, at the transmitter-side, the PSDU 106 is pre-appended during transmission with the PLCP preamble 102 and the PLCP header 104 in order to create the PPDU 100. At the receiver-side, the PLCP preamble 102 and PLCP header 104 serve as aids in the demodulation, decoding and delivery of the PSDU 106.

In FIG. 1, the PLCP header 104 is shown to be the second main component of the PPDU 100. The purpose of PLCP header 104 is to convey information about PHY and MAC parameters to aid in decoding the PSDU 106 at the receiver. In at least some embodiments, the PLCP header 106 comprises a PHY header field 112 (e.g., 15 bits in length), a header check sequence (HCS) field 114 (e.g., 4 bits in length), and a Bose, Ray-Chaudhuri, Hocquenghem (BCH) parity bits field (e.g., 12 bits in length). The BCH parity bits are added in order to improve the robustness of the PLCP header 104. The PHY header field 112 may further be decomposed into a RATE field 120 (e.g., 3 bits in length), a LENGTH field (e.g., 8 bits in length), a SCRAMBLER SEED field 128 (e.g., 1 bit in length), a BURST MODE field 130 (e.g., 1 bit in length), and reserved bit fields 122 and 126. The PLCP header 104 is transmitted using the given header data rate in the operating frequency band.

In FIG. 1, the PSDU 106 is shown to be the last component of the PPDU 100. The PSDU 106 is formed by concatenating a MAC header 132 (e.g., 7 bytes in length) with a MAC frame body 134 (e.g., 0-255 bytes in length) and a frame check sequence (FCS) (e.g., 2 bytes in length). In at least some embodiments, the PSDU 106 is scrambled and optionally encoded by a BCH code. The PSDU 106 may be transmitted using any of the available data rates available in the operating frequency band.

When transmitting the PPDU 100, the PLCP preamble 102 is sent first, followed by the PLCP header 104 and finally the PSDU 106. All multiple byte fields are transmitted with least significant byte first and each byte is transmitted with the least significant bit (LSB) first. In at least some embodiments, a compliant device is able to support transmission and reception in one of the following frequency bands: 402-405 MHz, 420-450 MHz, 863-870 MHz, 902-928 MHz, 950-956 MHz, 2360-2400 MHz and 2400-2483.5 MHz.

Various data-rate dependent parameters for each of these possible frequency bands of operation are provided herein and are intended to conform to established regulations, such as in the United States, Europe, Japan and Korea. FIGS. 2A-2G show tables with data-rate dependent parameter information for a PLCP header and a PSDU in accordance with embodiments of the disclosure. The data-rate dependent parameters in FIGS. 2A-2F include parameters such as modulation type, symbol rate (in ksps), code rate (k/n), spreading factor (S), bandwidth-bit duration (BT), pulse shape, information data rate (in kbps), and whether support for a set of parameters is mandatory or optional.

More specifically, the table 200 in FIG. 2A shows modulation parameter information for the frequency band 402-405 MHz, where a compliant device supports transmission and reception at a data rate of 75.9, 151.8 and 303.6 kbps. The table 210 in FIG. 2B shows modulation parameter information for the frequency band 420-450 MHz, where a compliant device supports transmission and reception at a data rate of 75.9 and 151.8 kbps. The table 220 in FIG. 2C shows modulation parameter information for the frequency band 863-870 MHz, where a compliant device supports transmission and reception at a data rate of 101.2, 202.4 and 404.8 kbps. The table 230 in FIG. 2D shows modulation parameter information for the frequency band 902-928 MHz, where a compliant device supports transmission and reception at a data rate of 121.4, 242.9 and 485.7 kbps. The table 240 in FIG. 2E shows modulation parameter information for the frequency band 950-956 MHz, where a compliant device supports transmission and reception at a data rate of 101.2, 202.4 and 404.8 kbps. The table 250 in FIG. 2F shows modulation parameter information for the frequency band 2360-2400 MHz, where a compliant device supports transmission and reception at a data rate of 121.4, 242.9, 485.7 and 971.4 kbps. The table 260 in FIG. 2G shows modulation parameter information for the frequency band 2400-2483.5 MHz, where a compliant device supports transmission and reception at a data rate of 121.4, 242.9, 485.7 and 971.4 kbps.

In at least some embodiments, a packet-based time-division duplex technique is implemented. In particular, one of the modes is based on rotated, differential M-PSK. In this modulation scheme, the information is encoded in the phase difference between two consecutive symbols. One of the key components of the packet is the preamble, since it aids the receiver in packet detection, acquisition, timing synchronization and carrier-offset recovery. Disclosed herein are preamble options constructed by concatenating a length-63 m-sequence with a 0101 sequence.

FIG. 3A-3B show tables 300 and 310 with preamble sequence values in accordance with embodiments of the disclosure. The tables 300 and 310 show two different length-63 m-sequence preambles (bits $b_0$ to $b_{62}$), each concatenated with an extension sequence (bit $b_{63}$ to bit $b_{89}$). Each m-sequence option is useful for packet detection, coarse-timing synchronization and carrier-offset recovery. For example, a receiver may implement a simple correlator to search for the preamble. The correlation is performed using the known transmitted preamble at the receiver. When the preamble is on-air, the magnitude of the correlator will result in a peak when the known preamble matches the preamble on-air. This peak can be found using a simple hypothesis (i.e., whether the peak is greater than a predetermined threshold). If the peak is above the threshold, then the receiver declares the packet to be on-air. In addition, the location of the peak provides information about the coarse-timing synchronization. Finally, the value of the peak provides an estimate of the carrier-frequency offset. Since the bits are differentially encoded in the phase, the differential detection results in constant-phase offset in each symbol. So after implementing the correlator, the output is equal to the output of the correlator with a zero frequency offset times a constant-phase offset. This constant-phase offset provide an estimate of the carrier-frequency offset, since the symbol is known at the receiver.

Each extension sequence (bit $b_{63}$ to bit $b_{89}$) of tables 300 and 310 has two components: a timing sequence ($b_{63}$ to bit $b_{74}$) and a DC-balanced sequence ($b_{75}$ to bit $b_{89}$). In tables 300 and 310, the timing sequence corresponds to a repeated 01 sequence and has various phase changes (or zero-crossings). These phase changes or zero-crossings can be exploited to refine the receiver's estimate of the timing. The techniques for using phase changes or zero-crossings to estimate and refining timing synchronization are well known in the relevant art. Meanwhile, the DC-balanced sequence of tables 300 and 310 corresponds to a repeated 101 sequence. The DC-balanced sequence provides enough state changes for reasonable clock recovery while achieving DC balance and bounded disparity among adjacent data symbols Wireless medical BAN devices are expected to be very low-power and very low cost. This implies that the receiver may not have very strong filters to reject adjacent channel interference (i.e., interference from other BAN networks on either side of the current channel). Without strong filters, energy from adjacent channels will bleed into the desired channel. If a single preamble is defined within the system, then it is possible that a preamble originating (being transmitted) on an adjacent channel will fold back into a receiver operating on the desired channel and will result in the packet detection algorithm declaring that a packet is on-air. Since this packet originated in an adjacent channel, this declaration is considered to be a false-alarm and will cause valuable energy to be wasted trying to decode the false packet.

By allocating two unique parameter sequences as in tables 300 and 310 in an intelligent manner, the occurrence of the false alarm conditions described above can be reduced. In at least some embodiments, preambles such as those given in tables 300 and 310 are defined in the table 2500 of FIG. 25, where n, is the channel number and ranges from 0 to N−1 and where N is the total number of channels available. In at least some embodiments, the preambles will be transmitted at the symbol rate for the desired band of operation and will be encoded using π/2-DBPSK. As an alternative, FSK (frequency shift keying), GFSK (Gaussian frequency shift keying) or GMSK (Gaussian minimum shift keying) may be used instead of π/2-DBPSK.

Figure 4:
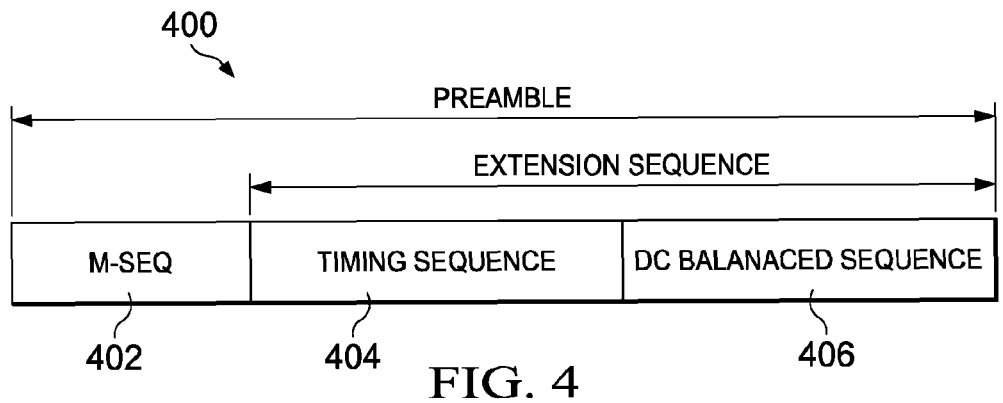
FIG. 4 shows a preamble structure in accordance with embodiments of the disclosure.

FIG. 4 shows a preamble structure 400 in accordance with embodiments of the disclosure. As shown, the preamble structure 400 comprises an m-sequence 402 and an extension sequence having a timing sequence 404 and a DC-balanced sequence 406. In at least some embodiments, the extension sequence is constructed by concatenating the timing sequence 404 with DC-balanced sequence 406. The timing sequence 404 may correspond to: K repetitions of any of (01) or (10), where K≥0. In some embodiments, the timing sequence 404 may be truncated. Meanwhile, the DC-balanced sequence 406 may correspond to: N repetitions of any of (100), (010), (001), (011), (101), (110), where N≥0. The DC-balanced sequence 406 also may be truncated. As an example, a length-14 DC-balanced sequence may be generated by repeating any of (100), (010), (001), (011), (101), (110) 5 times; and taking the first 14 bits. Although the extension sequence of FIG. 4 shows the timing sequence 404 before the DC-balanced sequence 406, alternative embodiments may position the DC-balanced sequence 406 before the timing sequence 404.

The advantage of the hybrid approach (concatenating the timing sequence 404 with the DC-balanced sequence 406) is that the first portion of the extension sequence (the timing sequence 406) can be used to estimate and correct the fine timing and fine frequency offset, while the second portion of the extension sequence (the DC-balanced sequence 404) can be used to estimate and remove any residual DC offset. The coarse timing and coarse frequency offset estimation can be performed on the m-sequence portion of the preamble. Accordingly, the preamble structure 400 with the extension sequence allows for a larger variety of receiver architectures. As an example, a 27-bit extension sequence may be: 01 01 01 01 0 101 101 101 101 101 101 (with spaces provided for readability). This 27-bit extension sequence comprises a 9-bit timing sequence 404 and a 12-bit DC-balanced sequence 406. Another example is a 24-bit extension sequence: 10 10 10 10 10 10 110 110 110 110. This 24-bit extension sequence comprises a 12-bit timing sequence 404 and a 12-bit DC-balanced sequence 406. Another example is a 21-bit extension sequence: 10 10 10 10 10 1 010 010 010 0. This 21-bit sequence comprises a 11-bit timing sequence 404 and an 10-bit DC-balanced sequence 406).

Figure 5:
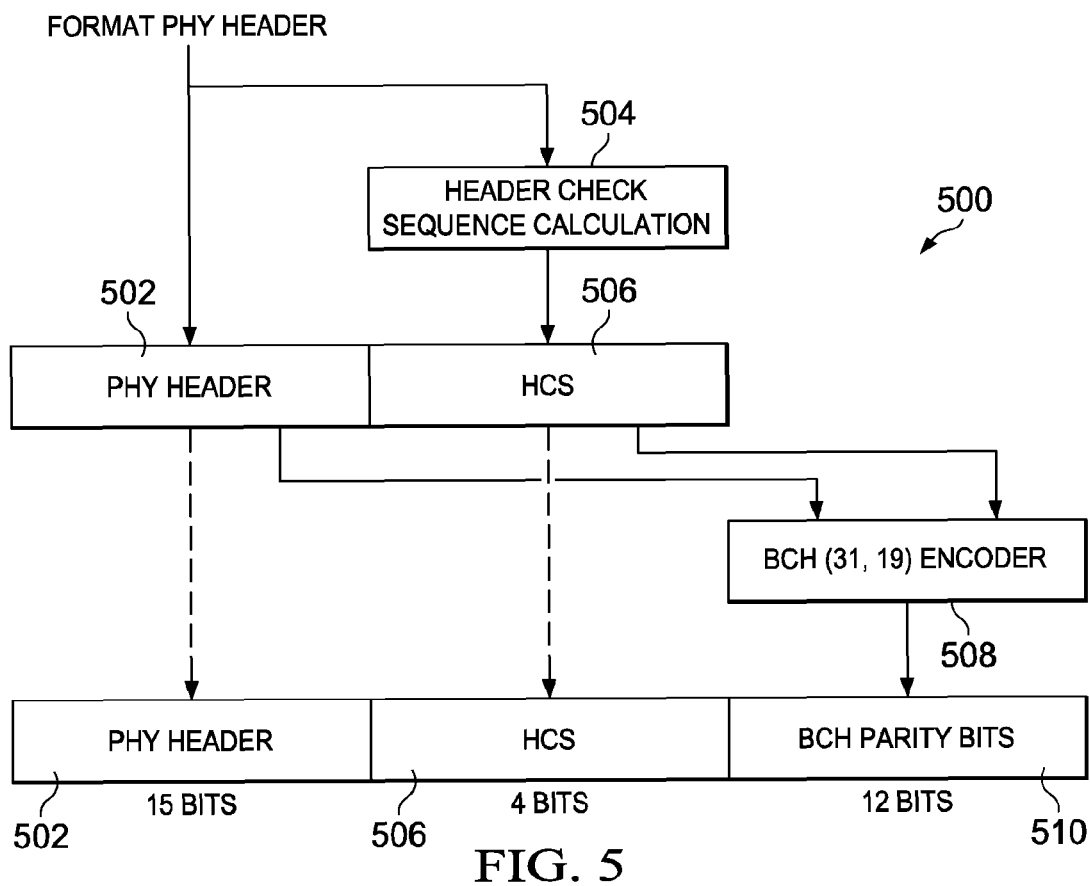
FIG. 5 shows a block diagram of PLCP header construction in accordance with embodiments of the disclosure.

FIG. 5 shows a block diagram 500 of PLCP header (e.g., the PLCP header 104) construction in accordance with embodiments of the disclosure. As shown in the block diagram 500, a PHY header 502 is concatenated with HCS bits 506 and BCH parity bits 510. The PHY header 502, the HCS bits 506, and the BCH parity bits 510 may correspond to the PHY header 112, the HCS field 114, and the BCH parity bit field 116 of FIG. 1. In FIG. 5, the PHY header 502 is formed based on information provided by the MAC. At block 504, a 4-bit HCS value is calculated over the PHY header 502 using the CRC-4 ITU polynomial: $1+x+x^4$ to generate the HCS field 506. Finally, a BCH encoder 508 applies a BCH (31, 19) code 510, which is shortened code derived from a BCH (63, 51) code, to the concatenation of the PHY header 502 (e.g., 15 bits in length) and the HCS field 506 (e.g., 4 bits in length). Shortening is well known in the literature, and in this case, it involves appending the 19 information bits with 32 zero bit in order to create the 51 bit message. After encoding, the 32 zero bits are removed from the output bit stream. The resulting encoded bits are modulated using the appropriate parameters specified in FIGS. 2A-2G for the desired frequency band of operation.

Figures 6, 7:
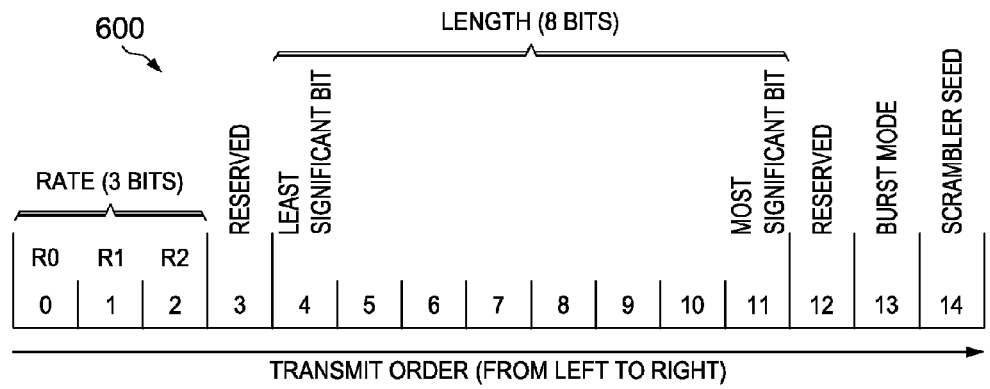
FIG. 6 shows a PHY header format in accordance with embodiments of the disclosure.
FIG. 7 shows a table of rate-dependent parameter information in accordance with embodiments of the disclosure.

FIG. 6 shows a PHY header format 600 in accordance with embodiments of the disclosure. In general, the PHY header format 600 contains information about the data rate of the MAC frame body, the length of the MAC frame body (which does not include the MAC header or the FCS) and information about the next packet (e.g., whether it is being sent in a burst mode, where multiple packets are transmitted consecutively using a minimum inter-frame spacing). More specifically, the PHY header format 600 of FIG. 6 comprises 15 bits, numbered from 0 to 14 as illustrated, LBS to MSB. Bits 0-2 correspond to a RATE field, which conveys information about the type of modulation, the symbol rate, frequency deviation or pulse shape, the coding rate, and the spreading factor used to transmit the PSDU. Bits 4-11 correspond to a LENGTH field, with the least-significant bit being transmitted first. In at least some embodiments, the LENGTH field corresponds to an unsigned 8-bit integer that indicates the number of un-coded information bytes in the MAC frame body (which does not include the MAC header or the FCS). Bit 13 corresponds to a burst mode bit that indicates whether or not the packet is being transmitted in the burst (streaming) mode. Bit 14 corresponds to a scrambler seed bit that encodes a scrambler seed. In at least some embodiments, the MAC sets the scrambler seed bit (SS) according to a seed value chosen for the data scrambler later described. All other bits (e.g., bits 3 and 12) of the PHY header format 600 are reserved for future use and are set to zero.

FIG. 7 shows a table 700 of rate-dependent parameter information in accordance with embodiments of the disclosure. In table 700, the parameters vary based on the value of the bits in the RATE field (bits R0-R2) of the PHY header format 600. As shown, the data rates related to each of RATE field values 000, 100, 010, and 110 varies depending on the frequency band of operations. Further, certain data rates are reserved in table 700.

Figures 8, 9, 12:
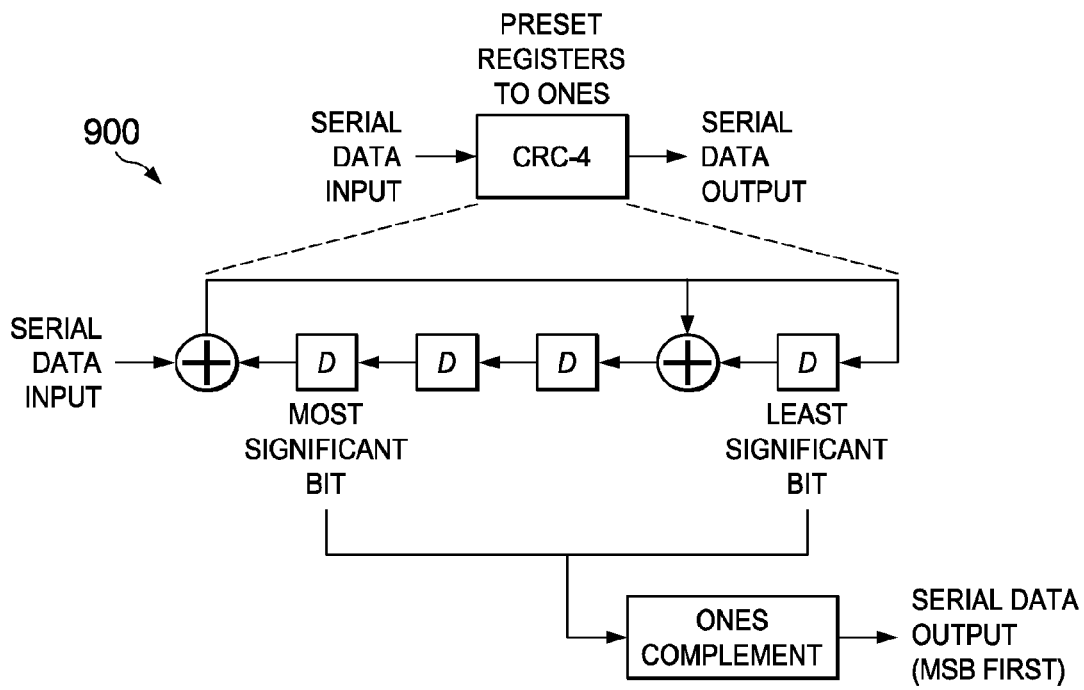
FIG. 8 shows a table of burst mode parameter information in accordance with embodiments of the disclosure.
FIG. 9 shows a block diagram of a CRC-4 implementation in accordance with embodiments of the disclosure.
FIG. 12 shows a scrambler seed selection table in accordance with embodiments of the disclosure.

FIG. 8 shows a table 800 of burst mode parameter information in accordance with embodiments of the disclosure. In at least some embodiments, the MAC sets the burst mode (BM) bit to indicate whether the next packet is part of a packet "burst" (i.e., burst mode transmission). In burst mode, the inter-frame spacing is equal to the pMIFS value (20 µs) shown in table 2600 of FIG. 26.

FIG. 9 shows a block diagram 900 of a CRC-4 implementation in accordance with embodiments of the disclosure. In accordance with at least some embodiments, the PHY header (e.g., PHY header 112 or 502) is protected with a 4-bit (CRC-4 ITU) header check sequence (HCS). The HCS corresponds to the ones complement of the remainder generated by the modulo-2 division of the PHY header by the polynomial: $1+x+x^4$. The HCS bits are processed in the transmit order. A schematic of the processing order is shown in block diagram 900. The registers for the CRC-4 operation are initialized to all ones, and the output is the ones compliment of the shift-register values.

Figure 10:
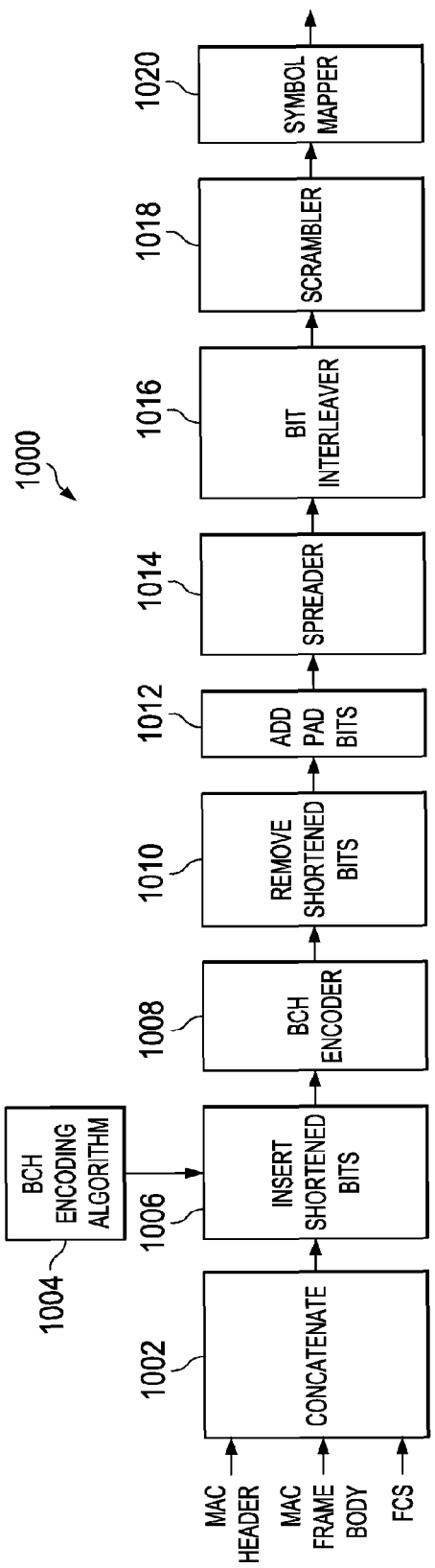
FIG. 10 shows a block diagram of PSDU construction in accordance with embodiments of the disclosure.

FIG. 10 shows a block diagram 1000 of PSDU construction in accordance with embodiments of the disclosure. During PSDU construction, the concatenate block 1002 forms the non-scrambled PSDU by pre-pending the 7-byte MAC header to the MAC frame body and appending a 2-byte FCS to the result. If the code rate (k/n)<1, the resulting PSDU is divided into blocks of messages, where each message may contain shortened bits inserted by the insert shortened bits block 1006. The operation of the insert shortened bits block 1006 is based in part on the input received from BCH encoding algorithm 1004. The resulting messages are then encoded into codewords using a BCH encoder 1008 to achieve the desired code rate. In at least some embodiments, the BCH encoder 1008 supports a code rate of 51/63. Finally, the shortened bits are removed from each of the codewords by the remove shortened bits block 1010. Pad bits are then added by the add pad bits block 1012 in order to ensure alignment on a symbol boundary. If the spreading factor is 2 or 4, the resulting un-coded or coded bits are spread by spreader 1014 using a repetition code, and then interleaved using bit interleaver 1016. The resulting bit stream is scrambled by scrambler 1018. The resulting bit steam from the scrambler 1018 is then mapped onto the appropriate constellation by symbol mapper 1020 based on the data rate and frequency band of operation. In block diagram 1000, the scrambler 1018 is located after the bit interleaver 1016 and runs at the (symbol rate)×(the number of bits per symbol). This makes the transmit signal more random and removes any spectral lines in the power spectral density of the transmit signal.

In alternative embodiments, the scrambler 1018 is positioned between the concatenate block 1002 and the insert shortened bits block 1006. In such embodiments, the PSDU output from the concatenate block 1002 is scrambled and is then processed by the insert shortened bits block 1006, the BCH encoder 1008, the remove shortened bits block 1010, the add pad bits block 1012, the spreader 1014 and the bit interleaver 1016 as described for FIG. 10. In other words, the position of the scrambling step for PSDU construction may vary.

Figure 11:
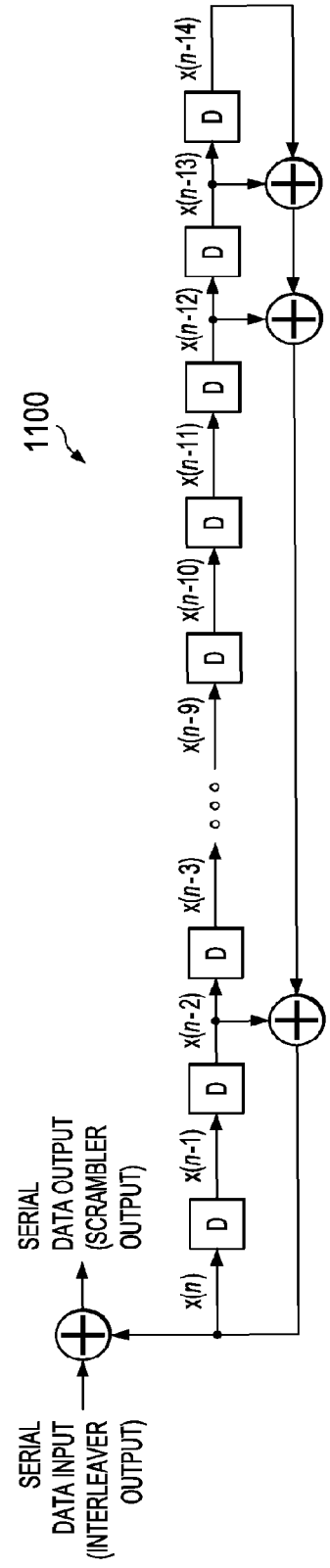
FIG. 11 shows a block diagram of a side-stream scrambler in accordance with the PSDU construction of FIG. 10.

FIG. 11 shows a block diagram 1100 of a side-stream scrambler in accordance with embodiments of the disclosure. The block diagram 1100 corresponds, for example, to the operation of scrambler 1018 in FIG. 10. In block diagram 1100, a side-stream scrambler with polynomial $G(x)=1+x^2+x^{12}+x^{13}+x^{14}$ is used to whiten a PSDU. The output of the scrambler is generated as: $x[n]=x[n-2]\oplus x[n-12]\oplus x[n-13]\oplus x[n-14]$, where "$\oplus$" denotes modulo-2 addition. The table 1200 of FIG. 12 defines the initialization vector, $x_{init}$, for the side-stream scrambler as a function of the scrambler seed (SS) value. In at least some embodiments, the MAC sets the scrambler seed to 0 when the PHY is initialized and the scrambler seed is incremented, using a 1-bit rollover counter, for each frame sent by the PHY. At the receiver-side, the side-stream de-scrambler is initialized with the same initialization vector, $x_{init}$, used by the transmitter. The initialization vector is determined from the scrambler seed value in the PHY header of the received frame.

Figure 13A:
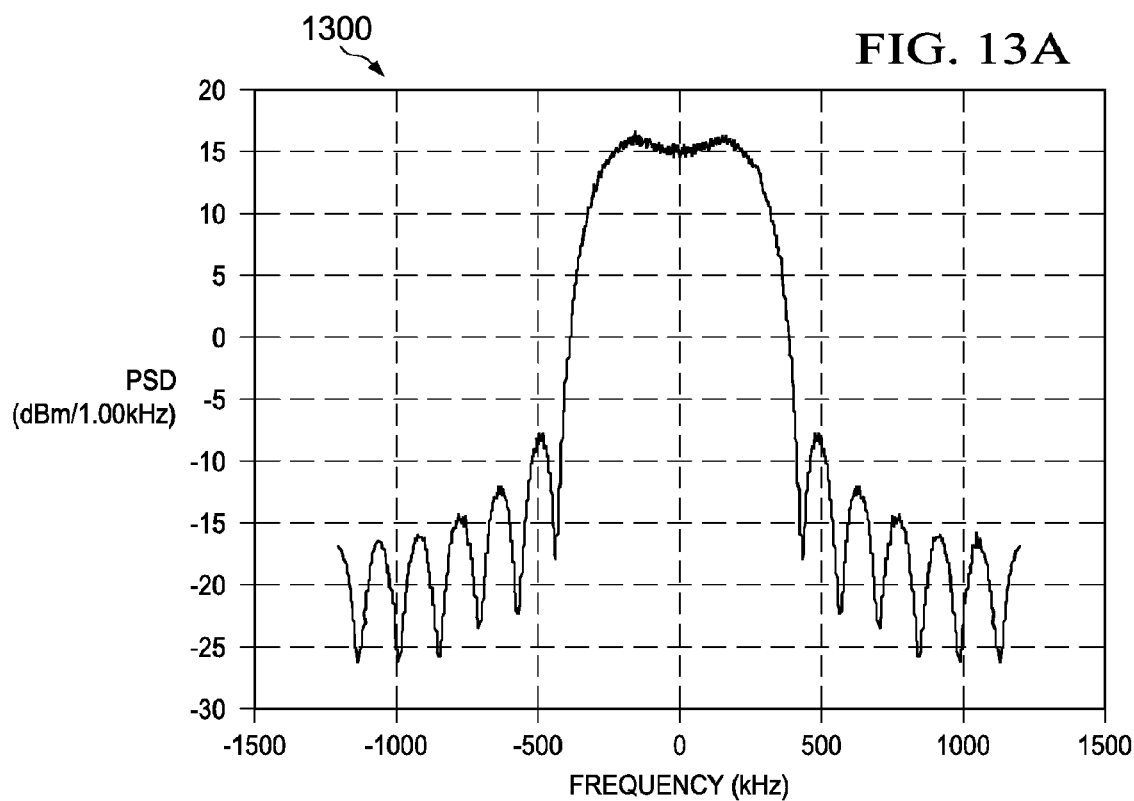
FIG. 13A-13B show power spectral density charts for the PSDU construction of FIG. 10.
Figure 13B:
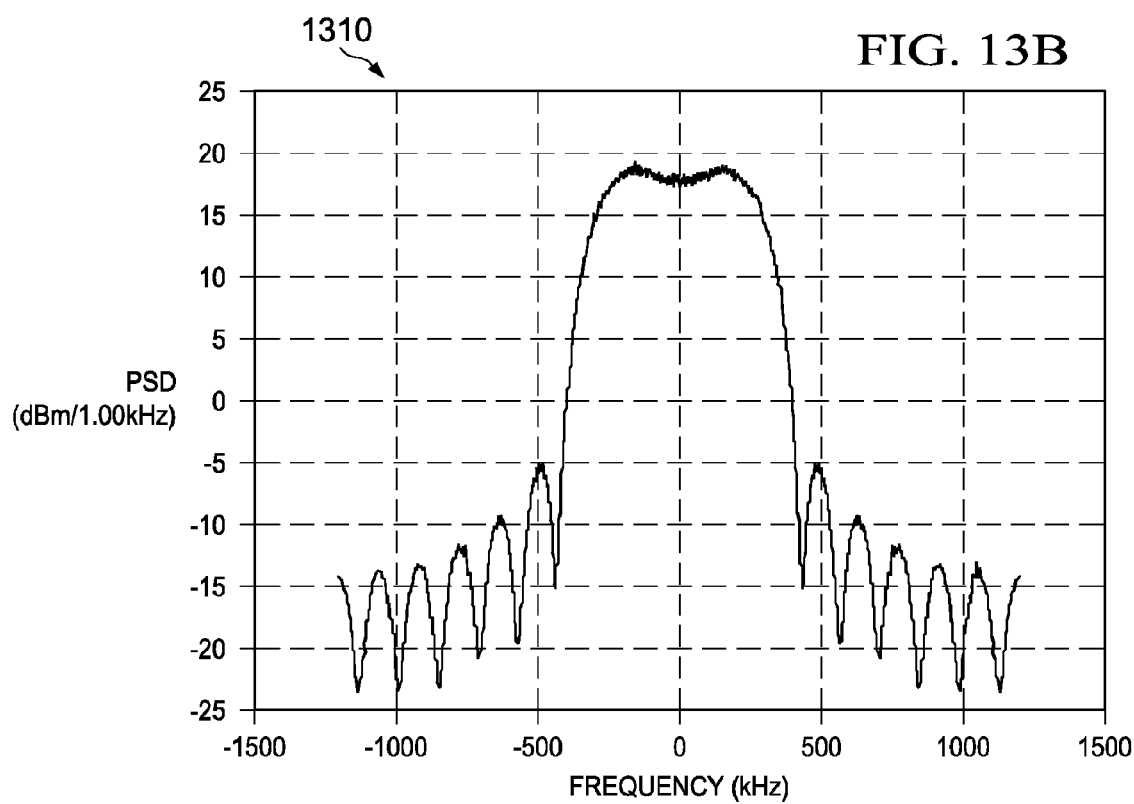

FIGS. 13A-13B show power spectral density charts 1300 and 1310 for the PSDU construction of FIG. 10. More specifically, the chart 1300 corresponds to a power spectral density when the spreading factor for the PSDU construction of FIG. 10 is two. Meanwhile, the chart 1310 corresponds to a power spectral density when the spreading factor for the PSDU construction of FIG. 10 is four. Importantly, spectral lines are reduced or eliminated for the spectral density charts 1300 and 1310 by positioning spreader 1014 before bit interleaver 1016.

Figure 14:
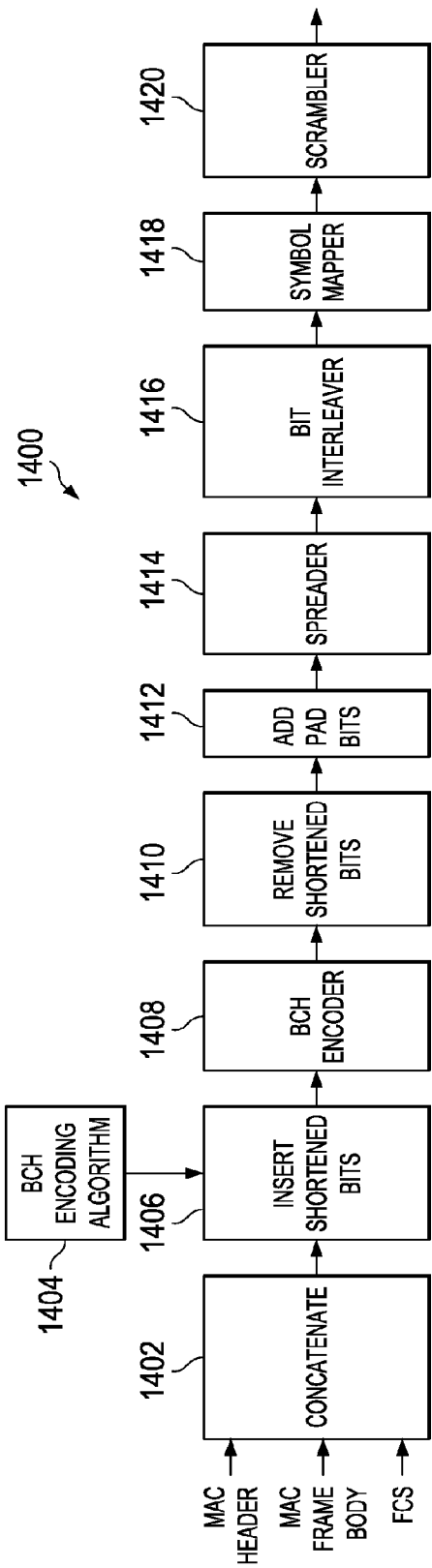
FIG. 14 shows an alternative PSDU construction in accordance with embodiments of the disclosure.

FIG. 14 shows a block diagram 1400 of an alternative PSDU construction in accordance with embodiments of the disclosure. As shown, for the PSDU construction of block diagram 1400, the scrambler 1420 is located after the symbol mapper 1418 and runs at symbol-level (in symbol rate). The PSDU construction components for block diagram 1400 are similar to the corresponding PSDU construction components for block diagram 1300, except for the scrambler 1418.

Figure 15:
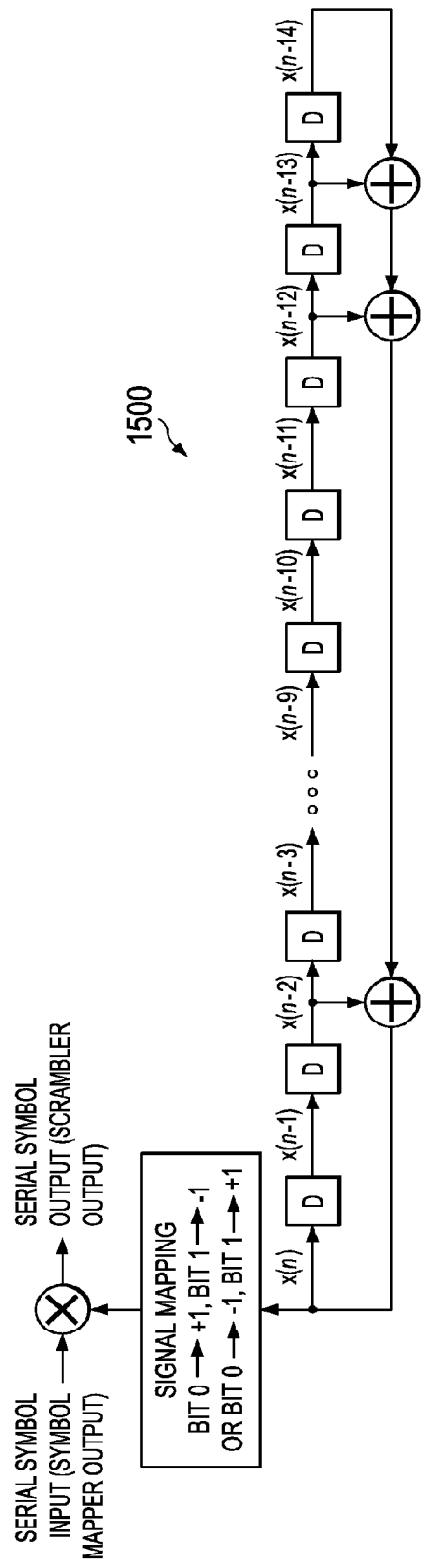
FIG. 15 shows a block diagram of a side-stream scrambler in accordance with the PSDU construction of FIG. 14.

FIG. 15 shows a block diagram of a side-stream scrambler (e.g., scrambler 1418) in accordance with the PSDU construction of FIG. 14. The scrambler 1418 has the same polynomial $G(x)=1+x^2+x^{12}+x^{13}+x^{14}$ as in the PSDU. The scrambler 1418 multiples the symbols (generally complex-numbered) by the scrambling sequence after mapping the binary {0,1} sequence to {+1,−1} sequence. Note that the mapping can either be bit 0 to −1, bit 1 to +1; or bit 0 to +1, bit 1 to −1, as long as the mapping is consistent between a transmitter and receiver.

Figure 16:
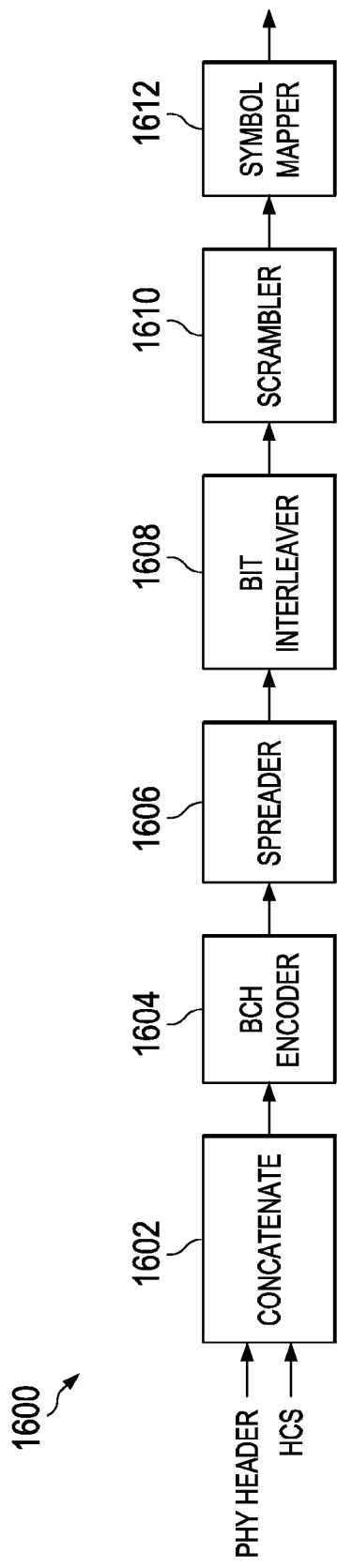
FIG. 16 shows a block diagram of PLCP header construction in accordance with embodiments of the disclosure.

FIG. 16 shows a block diagram 1600 of PLCP header construction in accordance with embodiments of the disclosure. As shown, the block diagram 1600 comprises a concatenate block 1602 that receives a PHY header and HCS as input. A BCH encoder 1604 operates on the output of the concatenate block 1602, followed by a spreader 1606, a bit interleaver 1608, a scrambler 1610, and a symbol mapper 1612. In the PLCP header construction of block diagram 1600, the scrambler 1610 is located after the bit interleaver 1608 and before the symbol mapper 1612. In at least some embodiments, the scrambler 1610 corresponds to the scrambler 1018 shown for the PSDU construction block diagram 1000 of FIG. 10.

In the PLCP header construction of block diagram 1600, the scrambling operation (at symbol level) of the scrambler 1610 is applied to PLCP header and the initial seed for the scrambler 1610 is known a priori to the receiver. One possible method for pre-assigning the scrambler seed is to map the even channels to scrambler seed 0, and odd channels to scrambler seed 1, or vice versa. As an example, if devices are operating on channel 2 (an even channel), then scrambler seed 0 would be used to scramble the PLCP header. At the end of the PLCP header, the scrambler 1610 would be re-initialized with the scrambler seed specified by the MAC (either scrambler seed 0 or 1), and the re-initialized scrambler would be used to scramble the PSDU. If devices are operating on channel 3 (an odd channel), then scrambler seed 1 would be used to scrambler the PLCP header. Again, at the end of the PLCP header, the scrambler 1610 would be re-initialized with the scrambler seed specified by the MAC (either scrambler seed 0 or 1), and the re-initialized scrambler would be used to scramble the PSDU. Although only one method is shown for pre-assigning the scrambler seed for the PLCP header based on the channel information, there are many other ways to pre-assign the scrambler seed for the PLCP header.

Figure 17:
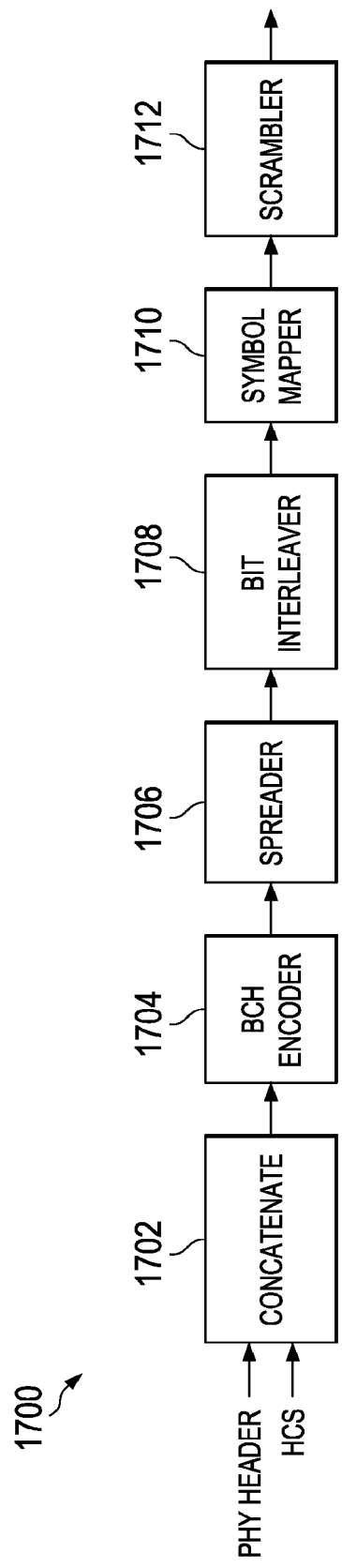
FIG. 17 shows a block diagram of an alternative PLCP header construction in accordance with embodiments of the disclosure.

FIG. 17 shows a block diagram 1700 of an alternative PLCP header construction in accordance with embodiments of the disclosure. The PLCP header construction components for block diagram 1700 are similar to the corresponding PLCP header construction components for block diagram 1600, except for the scrambler 1712. In the PLCP header construction of block diagram 1700, the scrambler 1712 is located after the symbol mapper 1710 and may correspond to scrambler 1420 for PSDU construction block diagram 1400.

Figure 18:
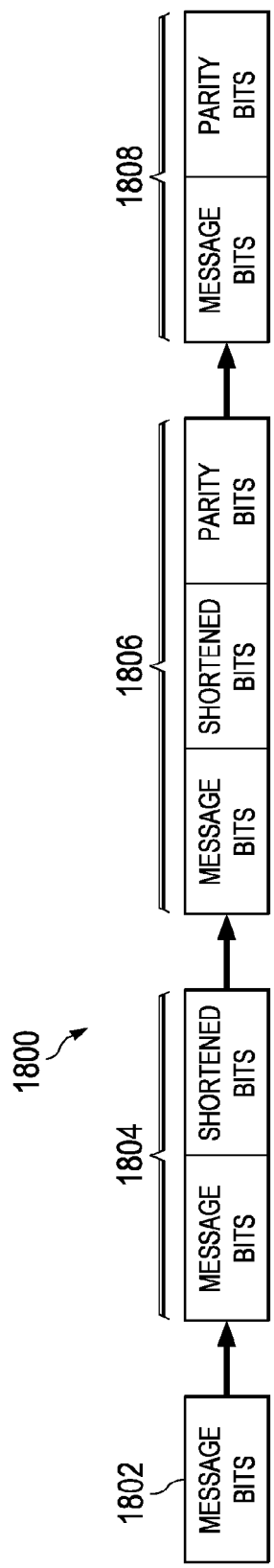
FIG. 18 shows a BCH encoding process for a single codeword in accordance with embodiments of the disclosure.

FIG. 18 shows a BCH encoding process 1800 for a single codeword in accordance with embodiments of the disclosure. The process 1800 starts with message bits at block 1802. At block 1804, shortened bits are added to the message bits. At block 1806, parity bits are added to the message bits and shortened bits. Finally, at block 1808, the shortened bits are removed, while the message bits and parity bits remain.

The BCH encoding process may be performed by any of the BCH encoders mentioned herein (e.g., BCH encoders 1008, 1408, 1604, 1704), which may represent the same BCH encoder. The scrambled or non-scrambled PSDU is encoded by computing the number of bits in the PSDU. In at least some embodiments, the number of bits in a PSDU is calculated as $N_{PSDU}=(N_{MACheader}+N_{MACFrameBody}+N_{FCS})\times 8$, where $N_{MACheader}$ is the number of bytes in the MAC header, $N_{MACFrameBody}$ is the number of bytes in the MAC frame body and $N_{FCS}$ is the number of bytes in the FCS. The number of BCH codewords is then calculated as $$N_{CW} = \left\lceil \frac{N_{PSDU}}{k} \right\rceil,$$

where k is the number of message bits for the selected BCH code. The number of shortening bits, $N_{shorten}$, to be padded to the $N_{PSDU}$ data bits before encoding is computed as $N_{shorten}=N_{CW}\times k-N_{PSDU}$. The shortening bits are equally distributed over all $N_{CW}$ codewords with the first rem $(N_{shorten},N_{CW})$ codewords being shortened one bit more than the remaining codewords. Assuming $$N_{spcw} = \left\lfloor \frac{N_{shorten}}{N_{CW}} \right\rfloor,$$

the first rem($N_{shorten},N_{CW}$) codewords will have $N_{spcw}+1$ shortened bits (message bits that are set to 0), while the remaining codewords will have $N_{spcw}$ shortened bits. After encoding, the shortened bits are discarded prior to transmission (i.e., the shortened bits are never transmitted on-air).

For a BCH (63, 51) encoder, the generator polynomial for a systematic BCH (63, 51, t=2) code is given as $g(x)=1+x^3+x^4+x^5+x^8+x^{10}+x^{12}$. The parity bits are determined by computing the remainder polynomial as $$r(x) = \sum_{i=0}^{11} r_i x^i = x^{12} m(x) \mathrm{mod} g(x),$$

where m(x) is the message polynomial $$m(x) = \sum_{i=0}^{50} m_i x^i \text{ and } r_i i = 0, \ldots, 11.$$

Further, $m_i$, i=0, . . . , 50 are elements of GF(2). The message polynomial m(x) is created as follows: $m_{50}$ is the first bit of the message and $m_0$ is the last bit of the message, which may be a shortened bit. The order of the parity bits is as follows: $r_{11}$ is the first parity bit transmitted, $r_{10}$ is the second parity bit transmitted, and $r_0$ is the last parity bit transmitted.

Pad bits are appended after the BCH encoder to ensure that the bit stream aligns on a symbol boundary. The number of pad bits, $N_{pad}$, that are inserted is a function of the number of PSDU bits $N_{PSDU}$, the number of codewords $N_{CW}$, the number of parity bits (n−k), and the modulation constellation size M determined from $$N_{pad} = \log_2(M) \times \left\lceil \frac{N_{PSDU} + N_{CW} \times (n-k)}{\log_2(M)} \right\rceil - [N_{PSDU} + N_{CW} \times (n-k)].$$

The pad bits are appended to the scrambled and encoded PSDU, where all of the appended pad bits are set to 0. In the case of un-coded transmission, $N_{CW}$ is set to zero.

Figure 19A:
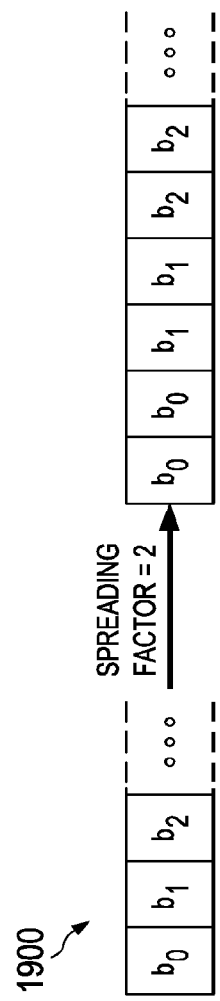
FIGS. 19A and 19B show a spreading scheme in accordance with embodiments of the disclosure.
Figure 19B:
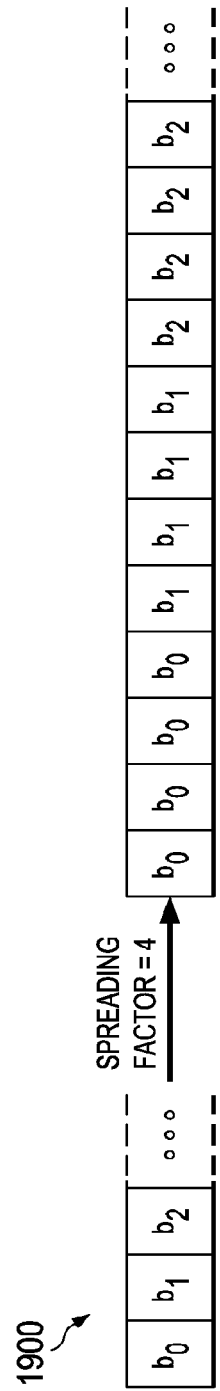

FIGS. 19A and 19B show a spreading scheme 1900 in accordance with embodiments of the disclosure. As shown in spreading scheme 1900, for a spreading factor of 2, each input bit is repeated two times. For a spreading factor of 4, each input bit is repeated four times.

In the PSDU construction of block diagrams 1000 (FIG. 10) and 1400 (FIG. 14), the bits interleavers 1016 and 1416 perform bit interleaving as given below. The same or similar bit interleaving process also may be performed by the bit interleavers 1608 and 1708 of the respective PLCP construction block diagrams 1600 (FIG. 16) and 1700 (FIG. 17). Although not required, the bit interleavers 1016, 1416, 1608, and 1708 may represent a single bit interleaver.

In at least some embodiments, the spreader output (e.g., from spreader 1014, 1414, 1606, 1706) is interleaved by a bit interleaver prior to modulation to provide robustness against error propagation. The exact structure of the bit interleaver depends on the number of un-coded or coded bits that will be transmitted on-air, which is given as $N_{total}=N_{PSDU}+N_{CW}\times(n-k)+N_{pad}$, where $N_{CW}$ is set to zero in the case of un-coded transmission. If rem($N_{total}$,2)=0, the bit interleaving operation is performed by first grouping the spread bits into blocks of 2S bits, where S is the spreading factor, and then using a block interleaver of size S×2 to permute the bits. Using sequences a(i) and b(i) (where i=0, 1, . . . , 2S-1) to respectively represent the input and output bits of the S×2 bit interleaver, the output of an S×2 bit interleaver is given as $$b(i) = a\left[S\times\text{rem}(i,2) + \left\lfloor\frac{i}{2}\right\rfloor\right] \quad i=0, 1, \ldots, 2S-1.$$

If rem($N_{total}$,2)=1, the bit interleaving operation is performed by grouping the first 3S spread bits into a single block and then using a block interleaver of size S×3 to permute the bits within that single block. Using sequences a(i) and b(i) (where i=0, 1, . . . , 3S-1) to respectively represent the input and output bits of a S×3 bit interleaver, the output of the S×3 bit interleaver is given as $$b(i) = a\left[S\times\text{rem}(i,3) + \left\lfloor\frac{i}{3}\right\rfloor\right] \quad i=0, 1, \ldots, 3S-1.$$

The remaining spread bits are then grouped into blocks of 2S bits and interleaved using a block interleaver of size S×2.

In the PSDU construction of block diagrams 1000 (FIG. 10) and 1400 (FIG. 14), the symbol mappers 1020 and 1418 perform may perform GMSK symbol mapping. The same or similar GMSK symbol mapping also may be performed by the symbol mappers 1612 and 1710 of the respective PLCP construction block diagrams 1600 (FIG. 16) and 1700 (FIG. 17). Although not required, the symbols mappers 1020, 1418, 1612, and 1710 may represent a single bit interleaver.

FIG. 20 shows a table 2000 with GMSK symbol mapping information in accordance with embodiments of the disclosure. For the GMSK constellation, the un-coded or coded, potentially spread and interleaved binary bit stream b(n), n=0, 1, . . . , N-1 is mapped onto a corresponding frequency deviation Δf, which is the product of the symbol rate and a modulation index of 0.5. The relationship between the bit stream b(n) and the frequency deviation is given in table 2000.

For the D-PSK constellations, the coded potentially spread and interleaved bit stream is mapped onto one of three rotated and differentially-encoded constellations: π/2-DBPSK, π/4-DQPSK, or π/8-D8PSK. The encoded information is carried in the phase transitions between symbols. For the PLCP preamble to PLCP header transition, the phase change is relative to the last symbol for the PLCP preamble. For the PLCP header to PSDU transition, the phase change is relative to the last symbol for the PLCP header. The binary bit stream b(n), n=0, 1, . . . , N-1 is mapped onto a corresponding complex-values sequence S(k), k=0, 1, . . . , (N/log$_2$(M))-1 as S(k)=S(k-1)exp(jφ$_k$) k=1, 2, . . . , (N/log$_2$(M))-1, where S(0)=exp(jπ/M) and the relationship between the bit stream b(n) and the phase change φ$_k$ is given in the tables 2100, 2200, 2300 of FIGS. 21-23 for π/2-DBPSK (M=2), π/4-DQPSK (M=4), or π/8-D8PSK (M=8), respectively.

As previously mentioned, a compliant device is able to support transmission and reception in one of the following frequency bands: 402-405 MHz, 420-450 MHz, 863-870 MHz, 902-928 MHz, 950-956 MHz, 2360-2400 MHz and 2400-2483.5 MHz. FIG. 24 shows a table 2400 with center frequency and channel number relationship information in accordance with embodiments of the disclosure. The mapping functions g$_1$(n$_c$) and g$_2$(n$_c$) used in the 420-450 MHz and 863-870 MHz frequency bands are respectively defined as $$g_1(n_c) = \begin{cases} n_c & 0 \le n_c \le 1 \\ n_c + 6.875 & 2 \le n_c \le 4 \\ n_c + 13.4 & n_c = 5 \\ n_c + 35.025 & 6 \le n_c \le 7 \\ n_c + 40.925 & 8 \le n_c \le 9 \\ n_c + 47.25 & 10 \le n_c \le 11 \end{cases}, \text{ and}$$

$$g_2(n_c) = \begin{cases} n_c & 0 \le n_c \le 7 \\ n_c + 0.5 & n_c = 8 \\ n_c + 1 & 9 \le n_c \le 12 \\ n_c + 1.5 & n_c = 13 \end{cases}.$$

FIG. 25 shows a table 2500 with channel number and preamble relationship information in accordance with embodiments of the disclosure. In table 2500, the allocation of preambles (e.g., the preamble sequences shown for FIGS. 3A-3C) is defined to reduce occurrence of false alarm conditions, where n$_c$ is the channel number and ranges from 0 to N-1 and where N is the total number of channels available.

FIG. 26 shows a table 2600 with PHY layer timing parameter information in accordance with embodiments of the disclosure. The values for pEDTime and pCCATime are either those specified in table 2600 or the values specified by the local regulatory requirements (e.g., whichever is lower).

FIG. 27 shows a table 2700 with inter-frame spacing parameter information in accordance with embodiments of the disclosure. As shown, the parameter SIFS has a value equal to pSIFS and the parameter MIFS has a value equal to pMIFS. In at least some embodiments, pSIFS is approximately 50 μs and pMIFS is approximately 20 μs as shown in table 2600 of FIG. 26. Other parameters are also related to the pSIFS and pMIFS values. For example, the Receive-to- Transmit (RX-to-TX) turnaround time is equal to or less than pSIFS. The RX-to-TX turnaround time is defined as the time elapsed from when the last sample of the last received symbol is present on the air interface, to the time when first sample of the first transmitted symbol of the PLCP preamble for the next frame is present on the air interface. Further, the Transmit-to-Receive (TX-to-RX) turnaround time is equal to or less than pSIFS. The TX-to-RX turnaround time is defined as the time elapsed from when the last sample of the last transmitted symbol is present on the air interface until the time when the receiver is ready to begin the reception of first sample for the next PHY frame. Further, for burst mode transmissions, the inter-frame spacing between uninterrupted successive transmissions by a device shall be fixed to pMIFS. The inter-frame spacing is defined as the time elapsed from when the last sample of the last transmitted symbol is present on the air interface, to the time when the first sample of the first transmitted symbol of the PLCP preamble for the following packet is present on the air interface. Further, the center frequency switch time is defined as the interval from when the PHY transmits or receives the last valid symbol on one center frequency until it is ready to transmit or receive the next symbol on a different center frequency. In at least some embodiments, the center frequency switch time does not exceed the pChannelSwitchTime value in table 2600 (i.e., 100 µs).

Various transmitter parameters are disclosed herein. FIG. 28 shows a table 2800 with channel bandwidth information as function of frequency band of operation in accordance with embodiments of the disclosure. In at least some embodiments, the transmitted spectral mask shall be less than −X dBr (dB relative to the maximum spectral density of the signal) for $|f-f_c| \geq f_{BW}/2$, where $f_c$ is channel center frequency and $f_{BW}$ is the channel bandwidth and is a function of the frequency band of operation. Values for $f_{BW}$ in relation to the frequency band of operation are given in table 2800 of FIG. 28.

In accordance with embodiments, the transmitted spectral density should comply with all regulations defined by local regulatory bodies. Further, a transmitter should be capable of transmitting at least −10 dBm EIRP in all frequency bands, except for 402-405 MHz, where a transmitter shall be capable of transmitting at most −16 dBm EIRP. Devices should transmit lower power when possible in order to reduce interference to other devices and systems. Again, the maximum transmit power is limited by local regulatory bodies.

Figure 29:
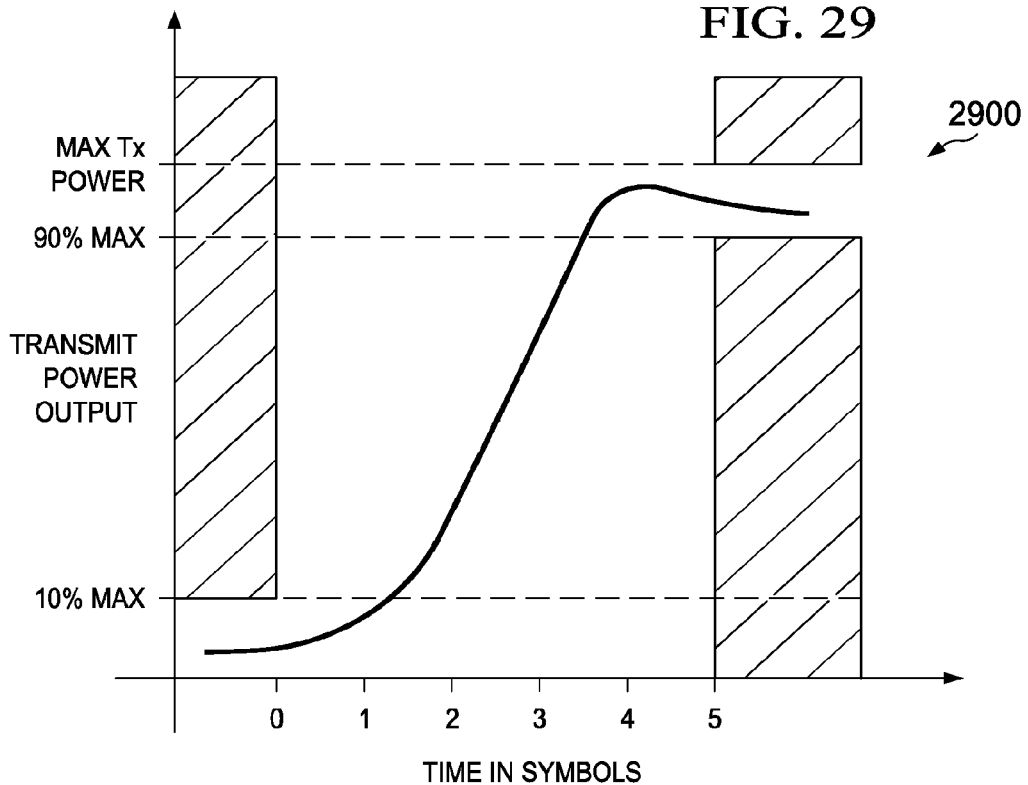
FIG. 29 shows a transmit power-on ramp diagram in accordance with embodiments of the disclosure.
Figure 30:
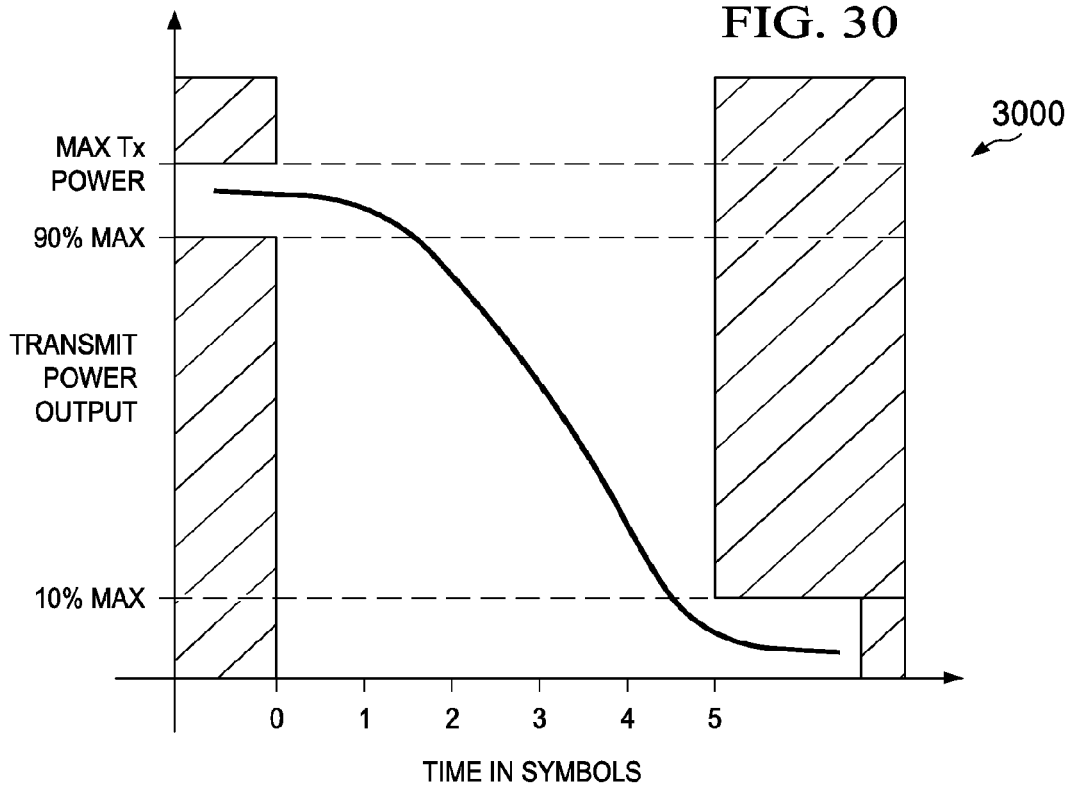
FIG. 30 shows a transmit power-down ramp diagram in accordance with embodiments of the disclosure.

FIG. 29 shows a transmit power-on ramp diagram 2900 in accordance with embodiments of the disclosure. As shown in diagram 2900, the transmit power-on ramp for 10% to 90% of maximum power is not more than 5 symbols. Similarly, FIG. 30 shows a transmit power-down ramp diagram 3000 in accordance with embodiments of the disclosure. As shown in the diagram 3000, the transmit power-down ramp for 90% to 10% maximum power is not more than 5 symbols. As needed, the transmit power ramps are constructed such that the emissions conform to the local spurious frequency regulations.

Further, in at least some embodiments, the transmitted center frequency tolerance is ±20 ppm maximum. The symbol clock frequency tolerance is ±20 ppm maximum. With regard to clock synchronization, the transmit center frequencies and the symbol clock frequency are derived from the same reference oscillator.

The modulation accuracy of the transmitter is determined via an error-vector magnitude (EVM) measurement, which is calculated over N baud-spaced received complex values $(\hat{I}_k, \hat{Q}_k)$. A decision is made for each received complex value. The ideal position of the chosen symbol is represented by the vector $(I_k, Q_k)$. The error vector $(\delta I_k, \delta Q_k)$ is defined as the distance from the ideal position to the actual position of the received complex values, i.e., $(\hat{I}_k, \hat{Q}_k) = (I_k, Q_k) + (\delta I_k, \delta Q_k)$.

The EVM is defined as shown in the equation below:

$$EVM = \sqrt{\frac{\frac{1}{N}\sum_{k=1}^{N}(\delta I_k^2 + \delta Q_k^2)}{S^2}} \times 100\%,$$

where S is the magnitude of the vector to the ideal constellation point. A transmitter shall have EVM values less than or equal to those listed in the table 3100 of FIG. 31, where the measure for N=TBD (to be determined) symbols. In at least some embodiments, the EVM is measured on baseband I and Q samples after the received signal is passed through a reference receiver, which shall perform the following operations: matched SRRC filtering, carrier-frequency offset estimation and symbol timing recovery while making the measurements.

Various receiver parameters are disclosed herein. FIG. 32 shows a table 3200 for receiver sensitivity information in accordance with embodiments of the disclosure. For a packet error rate (PER) of less than 10% with a PSDU of 255 bytes, the minimum receiver sensitivity numbers in AWGN for the highest data rate in each operating frequency band are listed in the table 3200. The minimum input levels are measured at the antenna connector, where a noise figure of 10 dB (referenced at the antenna), an implementation loss of 6 dB, and antenna gain of 0 dBi for both the transmitter and receiver are assumed.

In at least some embodiments, the receiver energy detection (ED) measurement is an estimate of the received signal power within the bandwidth of the channel. It is intended for use by a network/MAC layer as part of a channel selection algorithm. No attempt is made to identify or decode signals on the channel. Further the minimum ED value (zero) indicates received power less than either 10 dB above the specified receiver sensitivity (see table 3200 of FIG. 32), or a value prescribed local regulatory requirements (e.g., whichever is lower). In at least some embodiments, the range of received power spanned by the ED values is at least 40 dB. Within this range, the mapping from the received power in decibels to ED value is linear with an accuracy of ±6 dB. Further, the ED measurement time, to average over, is either pEDTime (8 preamble symbol periods) or a value prescribed by local regulatory requirements (e.g., whichever is longer in duration).

In at least some embodiments, the PHY is able to perform CCA according to at least one of the following three methods: CCA mode 1, CCA mode 2, and CCA mode 3. CCA mode 1 corresponds to an "energy above threshold" mode, in which CCA reports a busy medium upon detecting any energy above the ED threshold. CCA mode 2 corresponds to a "carrier sense only" mode, in which CCA reports a busy medium only upon the detection of a signal compliant with this standard with the same modulation and characteristics of the PHY that is currently in use by the device. This signal may be above or below the ED threshold. The CCA detection time is equal to pCCATime. The CCA mode 3 corresponds to a "carrier sense with energy above threshold" mode, in which CCA reports a busy medium using a logical combination of: 1) detection of a signal with the modulation and characteristics of this standard; and 2) energy above the ED threshold, where the logical operator may be "AND" or "OR". The CCA parameters are subject to the following criteria: 1) the ED threshold corresponds to a received signal power as prescribed in table 3200 of FIG. 32; and 2) the CCA detection time is equal to pCCATime (see table 2600 of FIG. 26). Any CCA procedures required by local regulatory requirements should also be supported.

Figure 33:
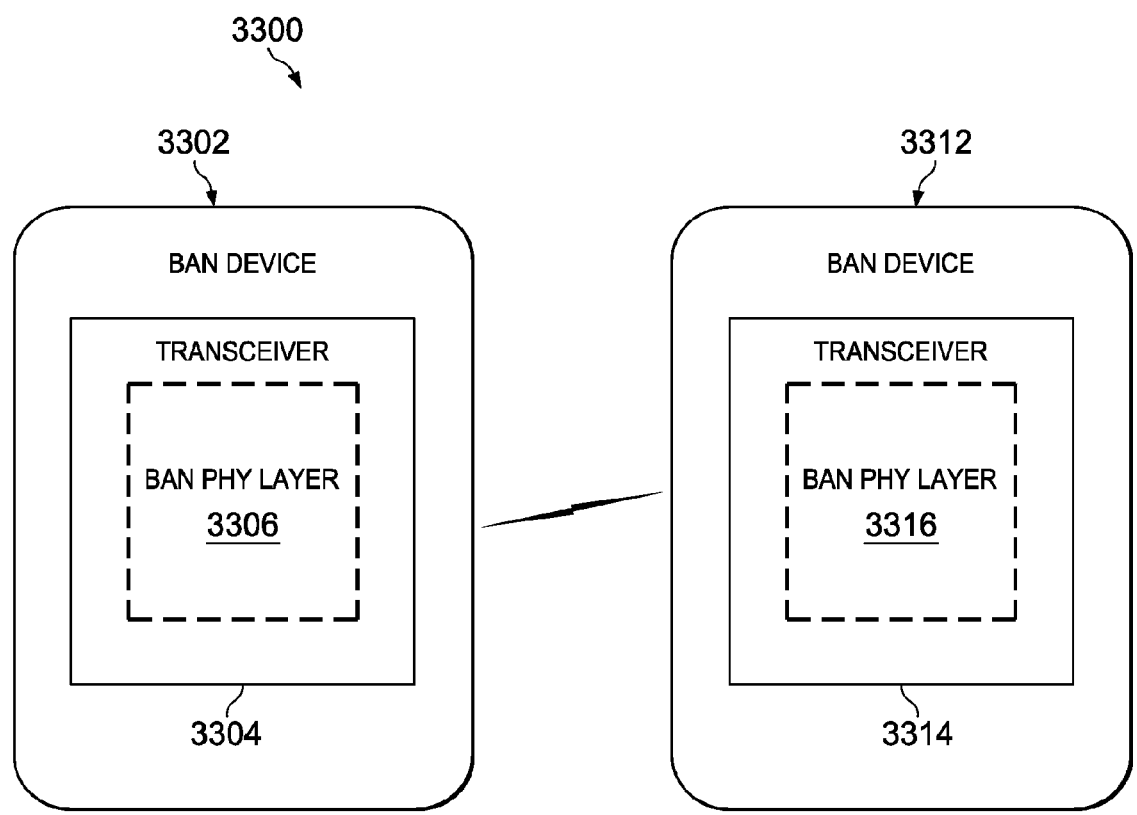
FIG. 33 shows a system in accordance with embodiments of the disclosure.

FIG. 33 shows a system 3300 in accordance with embodiments of the disclosure. The system 3300 comprises BAN devices 3302 and 3312 that communicate with each other based on implementation of at least some of the PHY options disclosed herein. The system could alternative comprises additional devices in communication with each other. The BAN devices 3302 and 3312 may correspond to medical devices (e.g., digital band-aids and pacemakers), but are not limited thereto. As shown, the BAN device 3302 comprises a transceiver 3304 with BAN PHY layer 3306. The BAN PHY layer 3306 implements at least some of the PHY options disclosed herein. Similarly, the BAN device 3312 comprises a transceiver 3314 with BAN PHY layer 3316, where the BAN PHY layer 3316 implements at least some of the PHY options disclosed herein. With the disclosed PHY options, the BAN devices 3302 and 3312 are each able to: 1) activate and deactivate a radio transceiver; 2) perform CCA within the current channel; and 3) transmit and receive data. Although BAN technology was developed for medical uses, the PHY options are not necessarily limited to a particular field. Again, the disclosed PHY layer options enable a low rate (e.g., less than 1 Mbps), very low-power (e.g., less than 3 mA), very short-range (e.g., less than 3 meters) wireless technology for use in any application.

In at least some embodiments, the PHY layer operations of PHY layers 3306 and 3316 may be implemented in hardware such as an application specific integrated circuit (ASIC). Additionally or alternatively, at least some of the PHY layer operations described herein are implemented by a processor that executes software. Additionally or alternatively, specialized hardware accelerators may be implemented to perform at least some of the PHY operations described herein.

The above discussion is meant to be illustrative of the principles and various embodiments of the present invention. Numerous variations and modifications will become apparent to those skilled in the art once the above disclosure is fully appreciated. For example, ordinary D-BPSK, D-QPSK, or D-8PSK may be used for BAN devices instead of the π/M shifted versions disclosed herein. Further, ordinary BPSK, QPSK and 8PSK may be used for BAN devices. It is intended that the following claims be interpreted to embrace all such variations and modifications.

What is claimed is:

1. A communication device, comprising:
a transceiver with a physical (PHY) layer implemented by a processor,
wherein the PHY layer is configured for body area network (BAN) packet transmissions and based on one of an M-ary PSK modulation, a differential M-ary PSK modulation, or a rotated differential M-ary PSK modulation,
wherein the PHY layer is configured to transmit and receive data in a frequency band selected from a group consisting of: 402-405 MHz, 420-450 MHz, 863-870 MHz, 902-928 MHz, 950-956 MHz, 2360-2400 MHz, and 2400-2483.5 MHz, and
wherein the PHY layer is configured to apply a transmitted spectral mask having −20 dBr for $|f-f_c| \geq f_{BW}/2$ where f represents a transmitted frequency, $f_c$ represents a channel center frequency and $f_{BW}$ represents a channel bandwidth of the selected frequency band.

2. The communication device of claim 1 wherein, if the PHY layer uses the 402-405 MHz frequency band, a 000 rate field value in a PHY header indicates a rate of 75.9 kbps, a 100 rate field value in the PHY header indicates a rate of 151.8 kbps, a 010 rate field value in the PHY header indicates a rate of 303.6 kbps, and a 110 rate field value in the PHY header indicates a rate of 455.4 kbps.

3. The communication device of claim 1 wherein, if the PHY layer uses the 402-405 MHz frequency band, the $f_{BW}$ is 300 kHz.

4. The communication device of claim 1 wherein, if the PHY layer uses the 420-450 MHz frequency band, a 000 rate field value in a PHY header indicates a rate of 75.9 kbps, a 100 rate field value in the PHY header indicates a rate of 151.8 kbps, a 010 rate field value in the PHY header indicates a rate of 187.5 kbps.

5. The communication device of claim 1 wherein, if the PHY layer uses the 420-450 MHz frequency band, the $f_{BW}$ is 320 kHz.

6. The communication device of claim 1 wherein, if the PHY layer uses the 863-870 MHz frequency band or the 950-956 MHz frequency band, a 000 rate field value in a PHY header indicates a rate of 101.2 kbps, a 100 rate field value in the PHY header indicates a rate of 202.4 kbps, a 010 rate field value in the PHY header indicates a rate of 404.8 kbps, and a 110 rate field value in the PHY header indicates a rate of 607.1 kbps.

7. The communication device of claim 1 wherein, if the PHY layer uses the 863-870 MHz frequency band or the 950-956 MHz frequency band, the $f_{BW}$ is 400 kHz.

8. The communication device of claim 1 wherein, if the PHY layer uses the 902-928 MHz frequency band, a 000 rate field value in a PHY header indicates a rate of 121.4 kbps, a 100 rate field value in the PHY header indicates a rate of 242.9 kbps, a 010 rate field value in the PHY header indicates a rate of 485.7 kbps, and a 110 rate field value in the PHY header indicates a rate of 728.6 kbps.

9. The communication device of claim 1 wherein, if the PHY layer uses the 902-928 MHz frequency band, the $f_{BW}$ is 400 kHz.

10. The communication device of claim 1 wherein, if the PHY layer uses the 2360-2400 MHz frequency band or the 2400-2483.5 MHz frequency band, a 000 rate field value in a PHY header indicates a rate of 121.4 kbps, a 100 rate field value in the PHY header indicates a rate of 242.9 kbps, a 010 rate field value in the PHY header indicates a rate of 485.7 kbps, and a 110 rate field value in the PHY header indicates a rate of 971.4 kbps.

11. The communication device of claim 1 wherein, if the PHY layer uses the 2360-2400 MHz frequency band or the 2400-2483.5 MHz frequency band, the $f_{BW}$ is 1 MHz.

12. The communication device of claim 1 wherein the PHY layer uses a pSIFS value of approximately 50 µs and a pMIFS of approximately 20 µs.

13. The communication device of claim 12 wherein the PHY layer uses a SIFS value equal to pSIFS and a MIFS value equal to pMIFS.

14. The communication device of claim 1 wherein the PHY layer uses a pEDTime of 8 preamble symbols.

15. The communication device of claim 1 wherein the PHY layer uses a pCCATime of 63 preamble symbols.

16. The communication device of claim 1 wherein the PHY layer uses a pChannelSwitchTime of 100 µs.

17. The communication device of claim 1 wherein the PHY layer comprises a transmitter capable of transmitting at least −10 dBm EIRP for the 420-450 MHz, 863-870 MHz, 902-928 MHz, 950-956 MHz, 2360-2400 MHz, and 2400-2483.5 MHz frequency bands, and wherein the transmitter is capable of transmitting at most −16 dBm EIRP for the 402-405 MHz frequency band.

18. The communication device of claim 1 wherein a transmit power-on ramp for the communication device changes from 10% to 90% of maximum power in 5 symbols or less.

19. The communication device of claim 1 wherein a transmit power-down ramp for the communication device changes from 90% to 10% of maximum power in 5 symbols or less.

20. The communication device of claim 1 wherein a transmitted center frequency tolerance for the PHY layer is a maximum of ±20 ppm.

21. The communication device of claim 20 wherein a symbol clock frequency tolerance for the PHY layer is a maximum of ±20 ppm.

22. The communication device of claim 21 wherein transmit center frequencies and a symbol clock frequency for the PHY layer are derived from a single reference oscillator.

23. The communication device of claim 1 wherein modulation accuracy is determined as $$EVM = \sqrt{\frac{\frac{1}{N}\sum_{k=1}^{N}(\delta I_k^2 + \delta Q_k^2)}{S^2}} \times 100\%,$$

computed over N baud-spaced received complex values $(\hat{I}_k, \hat{Q}_k)$, where error vector $(\delta I_k, \delta Q_k)$ is the distance from an ideal position to an actual position of the received complex values and S is the magnitude of the vector to an ideal constellation point.

24. The communication device of claim 23, if the PHY layer uses π/2-DBPSK modulation, the EVM is equal to or less than 20%.

25. The communication device of claim 23, if the PHY layer uses π/4-DQPSK modulation, the EVM is equal to or less than 12.5%.

26. The communication device of claim 23, if the PHY layer uses π/8-D8PSK modulation, the EVM is equal to or less than 7.0%.

27. The communication device of claim 23 wherein EVM is measured on baseband I and Q samples after a received signal is passed through a reference receiver that performs the following operations: matched SRRC filtering, carrier-frequency offset estimation and symbol timing recovery while making the measurements.

28. The communication device of claim 1 wherein, for a packet error rate (PER) of less than 10% with a PSDU of 255 bytes, minimum receiver sensitivity for the 402-405 MHz frequency band is −98 dBm at 75.9 kbps, −95 dBm at 151.8 kbps, −92 dBm at 303.6 kbps, and −86 dBm at 455.4 kbps.

29. The communication device of claim 1 wherein, for a packet error rate (PER) of less than 10% with a PSDU of 255 bytes, minimum receiver sensitivity for the 420-450 MHz frequency band is −93 dBm at 75.9 kbps, −90 dBm at 151.8 kbps, and −87 dBm at 187.5 kbps.

30. The communication device of claim 1 wherein, for a packet error rate (PER) of less than 10% with a PSDU of 255 bytes, minimum receiver sensitivity for the 863-870 MHz frequency band or the 950-956 frequency band is −97 dBm at 101.2 kbps, −94 dBm at 202.4 kbps, −90 dBm at 404.8 kbps, and −85 dBm at 607.1 kbps.

31. The communication device of claim 1 wherein, for a packet error rate (PER) of less than 10% with a PSDU of 255 bytes, minimum receiver sensitivity for the 902-928 MHz frequency band is −96 dBm at 121.4 kbps, −93 dBm at 242.9 kbps, −89 dBm at 485.7 kbps, and −84 dBm at 728.6 kbps.

32. The communication device of claim 1 wherein, for a packet error rate (PER) of less than 10% with a PSDU of 255 bytes, minimum receiver sensitivity for the 2360-2400 MHz frequency band or the 2400-2483.5 MHz frequency band is −95 dBm at 121.4 kbps, −93 dBm at 242.9 kbps, −90 dBm at 485.7 kbps, and −86 dBm at 971.4 kbps.

33. The communication device of claim 1 wherein the PHY layer performs clear channel assessment (CCA) according to an energy above threshold mode.

34. The communication device of claim 1 wherein the PHY layer performs clear channel assessment (CCA) according to a carrier sense only mode.

35. The communication device of claim 1 wherein the PHY layer performs clear channel assessment (CCA) according to a carrier sense with energy above threshold mode.

* * * * *